US012458124B2

(12) United States Patent
Park et al.

(10) Patent No.: US 12,458,124 B2
(45) **Date of Patent: *Nov. 4, 2025**

(54) METHOD FOR CONTROLLING HAIR DRYER

(71) Applicant: LG ELECTRONICS INC., Seoul (KR)

(72) Inventors: Sunjung Park, Seoul (KR); Daekee Shin, Seoul (KR); Hophil Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 875 days.

This patent is subject to a terminal disclaimer.

(21) Appl. No.: 17/766,623

(22) PCT Filed: Jul. 16, 2020

(86) PCT No.: PCT/KR2020/009351

§ 371 (c)(1),
(2) Date: Apr. 5, 2022

(87) PCT Pub. No.: WO2021/071064

PCT Pub. Date: Apr. 15, 2021

(65) Prior Publication Data

US 2023/0309676 A1 Oct. 5, 2023

(30) Foreign Application Priority Data

Oct. 8, 2019 (KR) ........................ 10-2019-0124461

(51) Int. Cl.
*A45D 20/12* (2006.01)
*F21V 33/00* (2006.01)

(52) U.S. Cl.
CPC .......... *A45D 20/12* (2013.01); *F21V 33/0044* (2013.01)

(58) Field of Classification Search
CPC ............................ A45D 20/12; F21V 33/0044
(Continued)

(56) References Cited

U.S. PATENT DOCUMENTS 4,595,838 A * 6/1986 Kerschgens ........... A45D 20/10 250/504 R
5,155,925 A * 10/1992 Choi ...................... A45D 20/06 432/222
(Continued)

FOREIGN PATENT DOCUMENTS

CN 204032615 12/2014
CN 107853851 3/2018
(Continued)

OTHER PUBLICATIONS

Korean Intellectual Property Office Application No. 10-2019-0124461, Notice of Allowance dated Feb. 16, 2021, 3 pages.
(Continued)

*Primary Examiner* — Stephen M Gravini
(74) *Attorney, Agent, or Firm* — LEE, HONG, DEGERMAN, KANG & WAIMEY

(57) ABSTRACT

Disclosed is a method for controlling a hair dryer, the method for controlling a hair dryer, which comprises a main body part, a handle part, an operation part, a heating unit and a fan unit, according to one embodiment of the present invention comprising: an auto mode selection step in which a user operates the operation part so as to select, among a plurality of operation modes, an auto mode including a plurality of individual modes; and an auto mode performance step in which the plurality of individual modes are consecutively performed, wherein at least one among the temperature and speed of discharged gas is set to be different for each of the plurality of individual modes, and in the auto mode performance step, the heating unit and the fan unit control the temperature and speed of the discharged gas according to the respective settings of the plurality of individual modes.

15 Claims, 27 Drawing Sheets

(58) Field of Classification Search
USPC .............................................. 34/283, 95–100
See application file for complete search history.

(56) References Cited

U.S. PATENT DOCUMENTS

| | | | | | |
|---|---|---|---|---|---|
| 5,642,570 | A * | 7/1997 | Lee | B05B 7/2416 34/98 |
| 5,857,262 | A * | 1/1999 | Bonnema | F24H 3/0488 431/344 |
| 9,756,922 | B1 * | 9/2017 | Duthe | A45D 20/12 |
| 10,575,616 | B2 * | 3/2020 | Riazor Vilches | A01K 13/002 |
| 10,820,677 | B2 * | 11/2020 | Thomas | H02J 7/0044 |
| 11,253,039 | B1 * | 2/2022 | Lei | A45D 20/12 |
| 11,559,125 | B2 * | 1/2023 | Taylor | A45D 20/14 |
| 11,571,056 | B2 * | 2/2023 | Min | A45D 20/00 |
| 11,641,918 | B2 * | 5/2023 | Jeong | A45D 20/12 34/97 |
| 2023/0309676 | A1 * | 10/2023 | Park | F21V 33/0044 34/283 |
| 2023/0329411 | A1 * | 10/2023 | Park | H05B 47/105 |

FOREIGN PATENT DOCUMENTS

| | | | | |
|---|---|---|---|---|
| CN | 108433318 | | 8/2018 | |
| ES | 1145159 | U * | 10/2015 | A01K 13/00 |
| JP | 2012157420 | | 8/2012 | |
| JP | 2017077470 | | 4/2017 | |
| JP | 2019025143 | | 2/2019 | |
| KR | 20110002760 | | 1/2011 | |
| KR | 101059069 | | 8/2011 | |
| KR | 101563468 | | 10/2015 | |
| KR | 20170105099 | | 9/2017 | |
| KR | 20180031292 | | 3/2018 | |
| KR | 20210041797 | A * | 4/2021 | |
| WO | WO-2021071062 | A1 * | 4/2021 | A45D 20/10 |

OTHER PUBLICATIONS

Taiwan Intellectual Property Office Application Serial No. 109124467, Office Action dated Mar. 10, 2021, 22 pages.
PCT International Application No. PCT/KR2020/009351, International Search Report dated Mar. 16, 2021, 13 pages.

* cited by examiner

【FIG. 1】
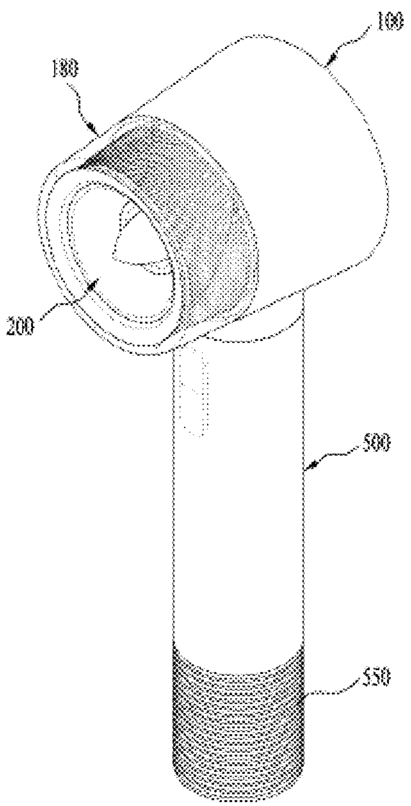

【FIG. 2】
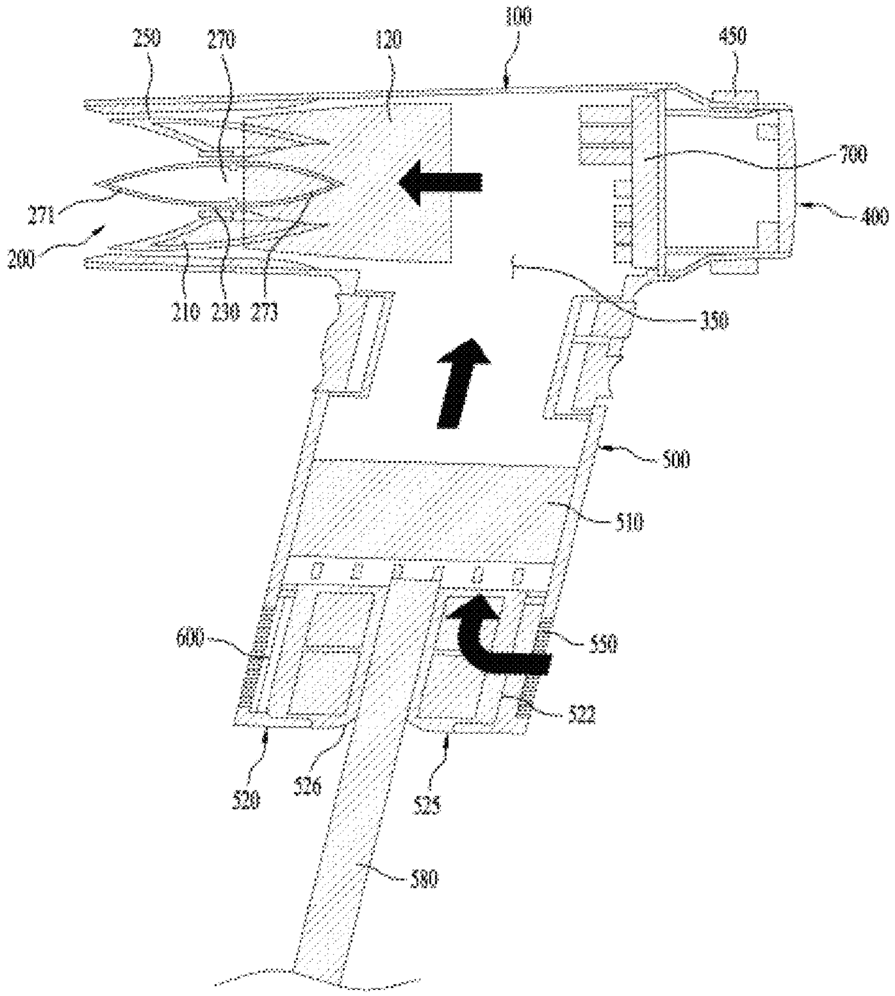

【FIG. 3】
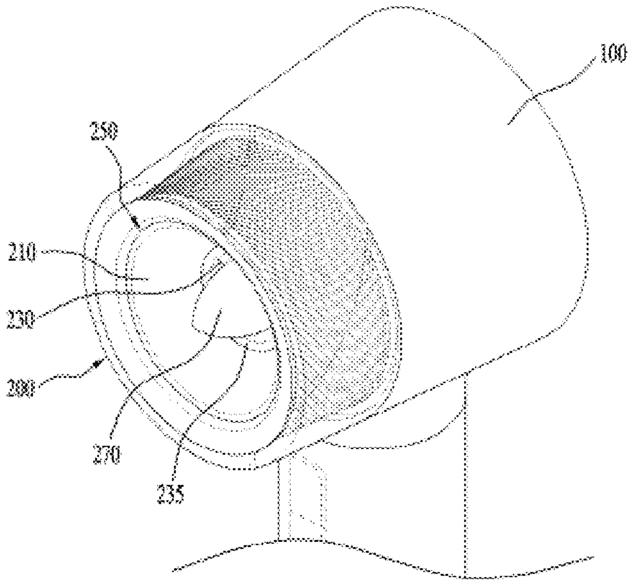

【FIG. 4】
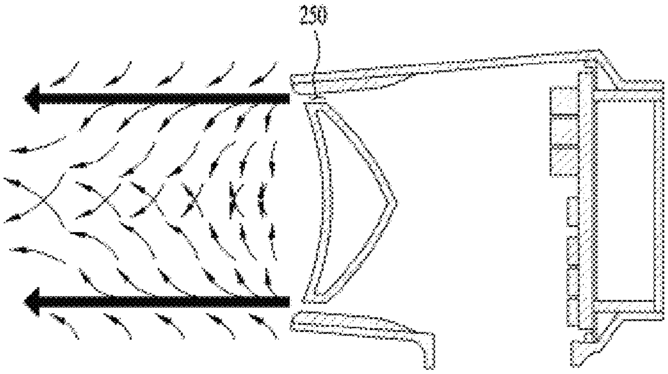

【FIG. 5】
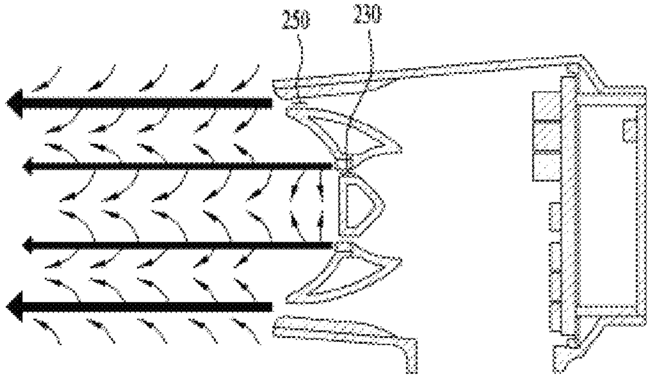

【FIG. 6】
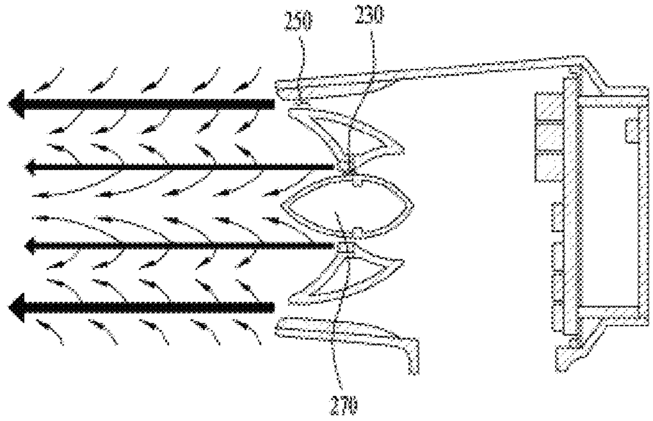

【FIG. 7】
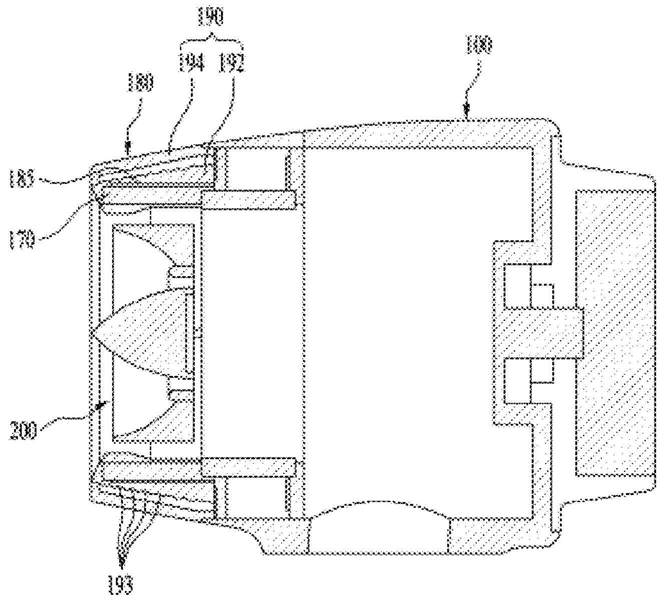

【FIG. 8】
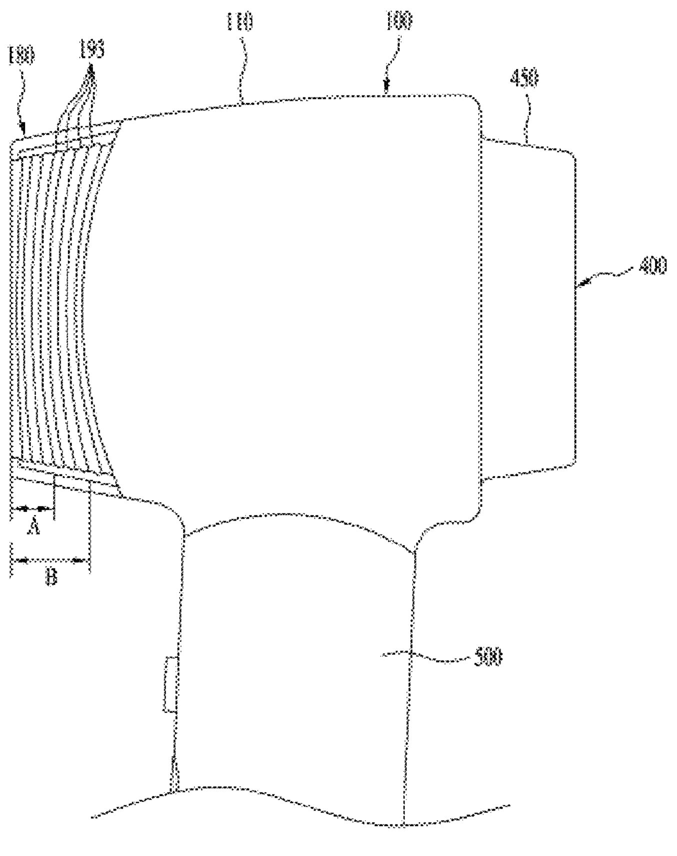

【FIG. 9】
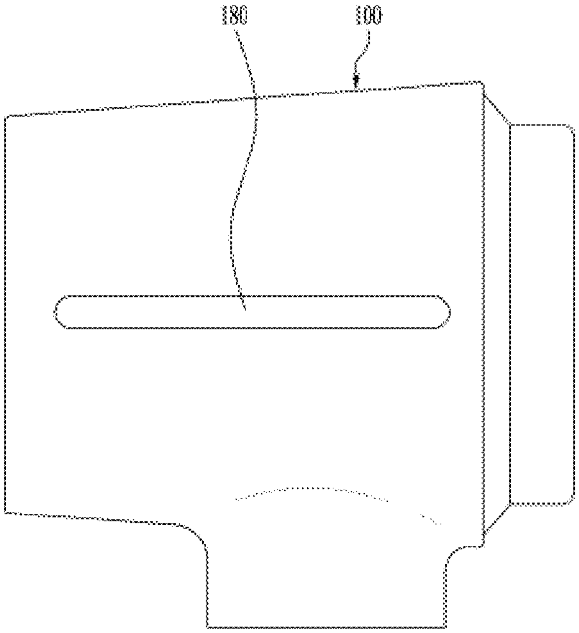

【FIG. 10】
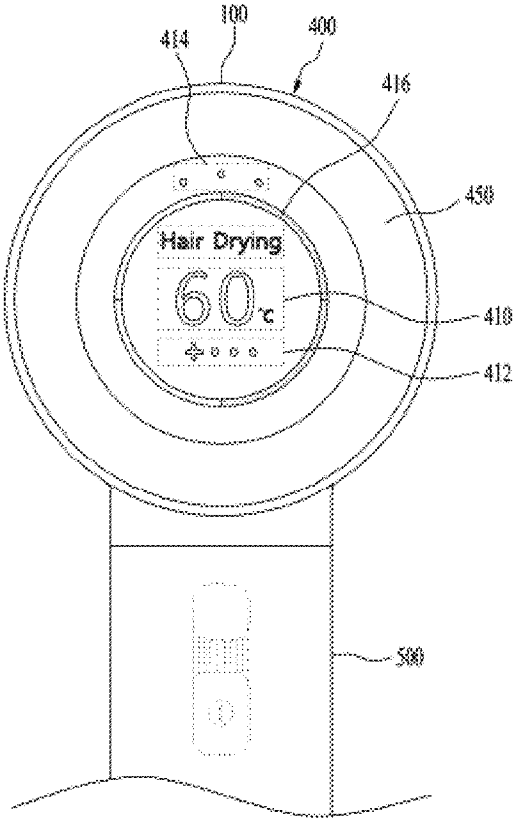

【FIG. 11】
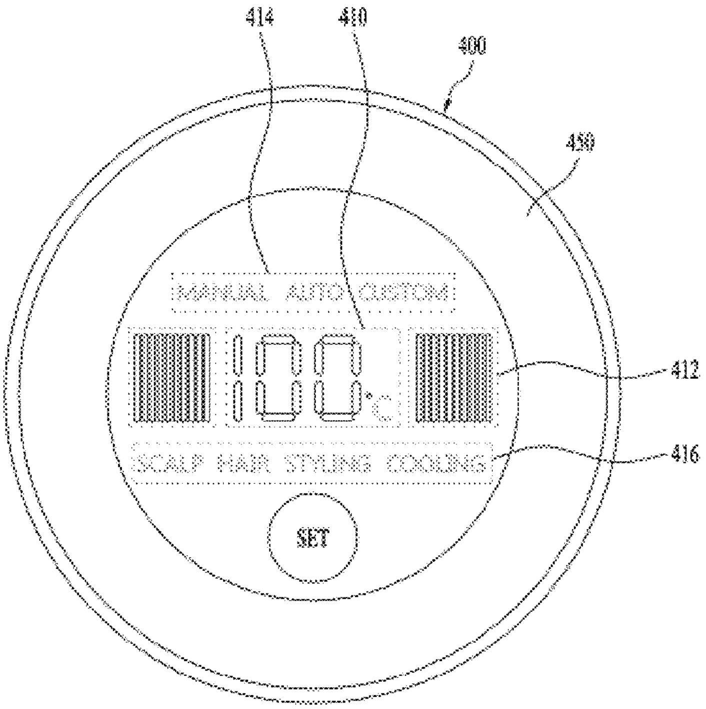

【FIG. 12】
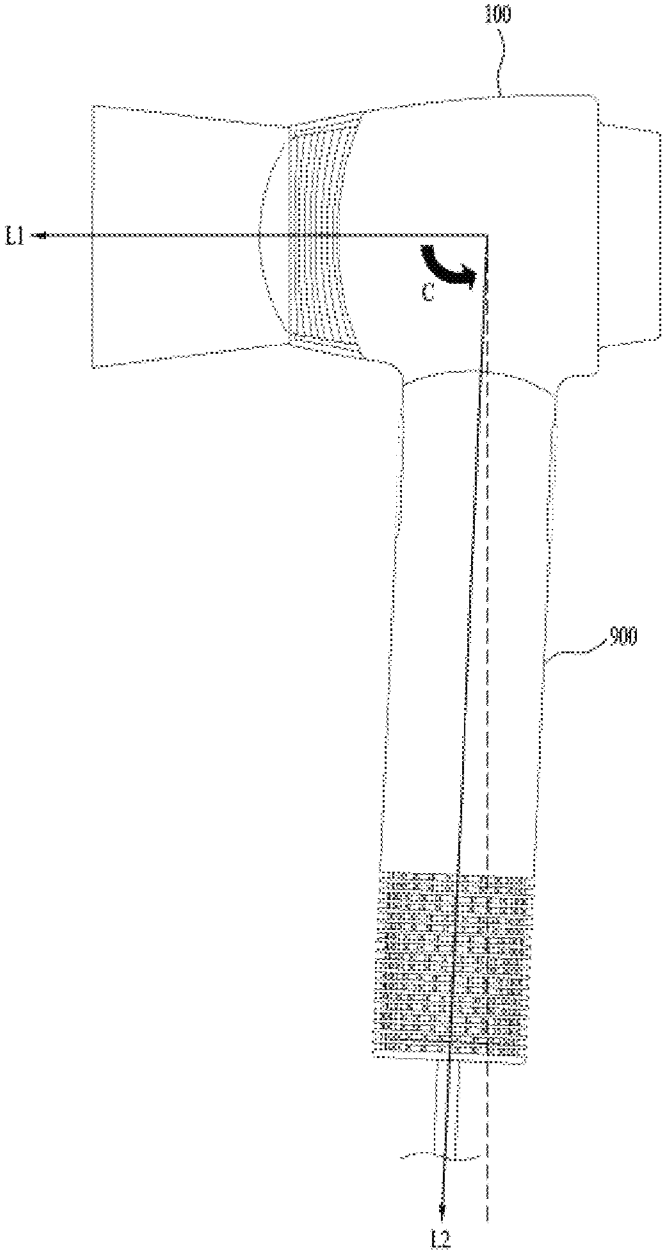

【FIG. 13】
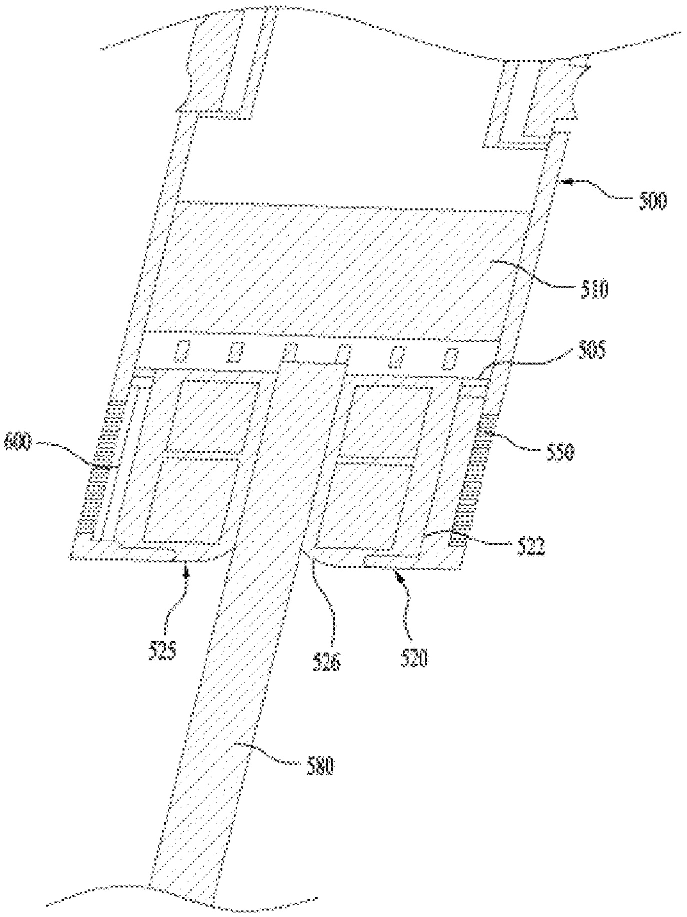

【FIG. 14】
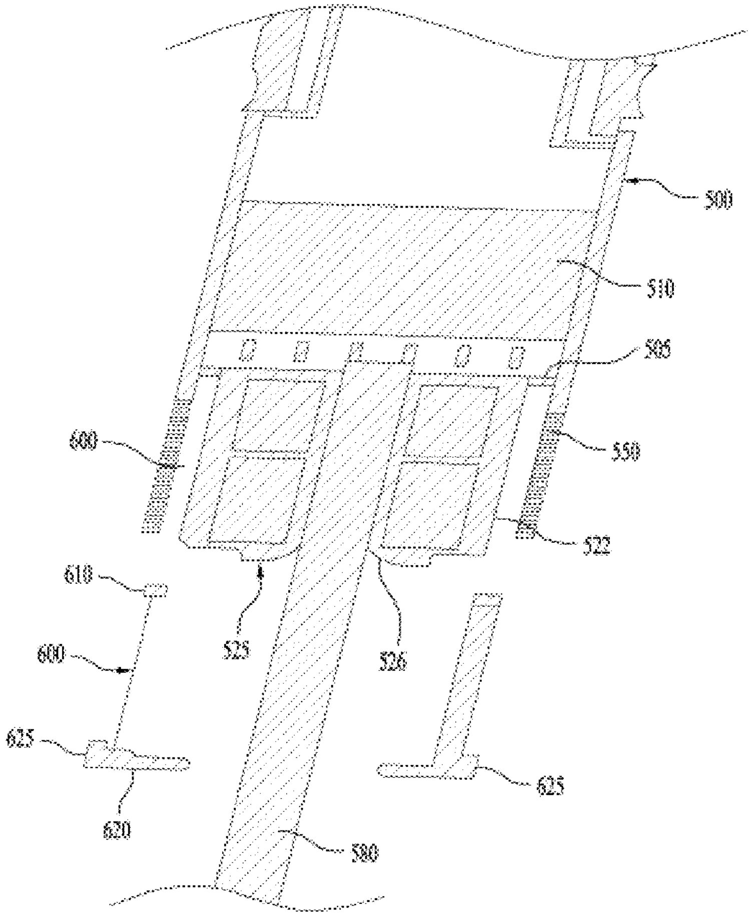

【FIG. 15】
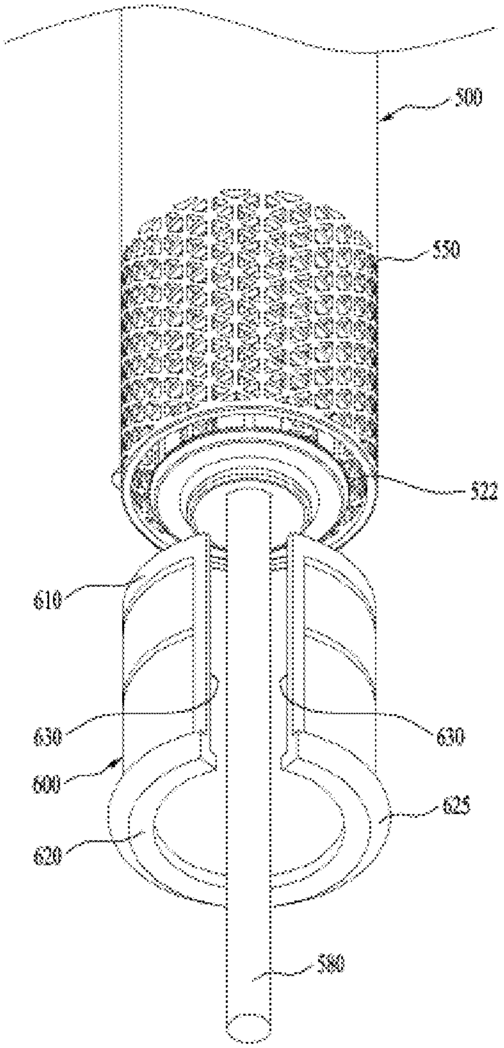

【FIG. 16】
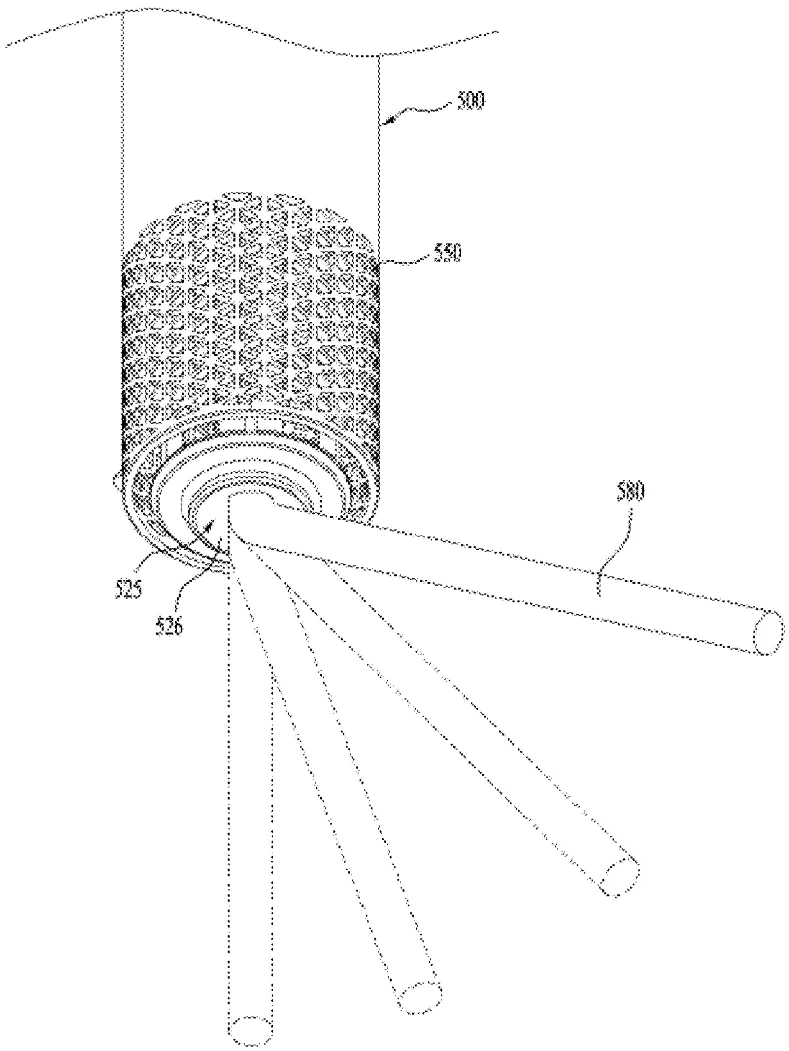

【FIG. 17】
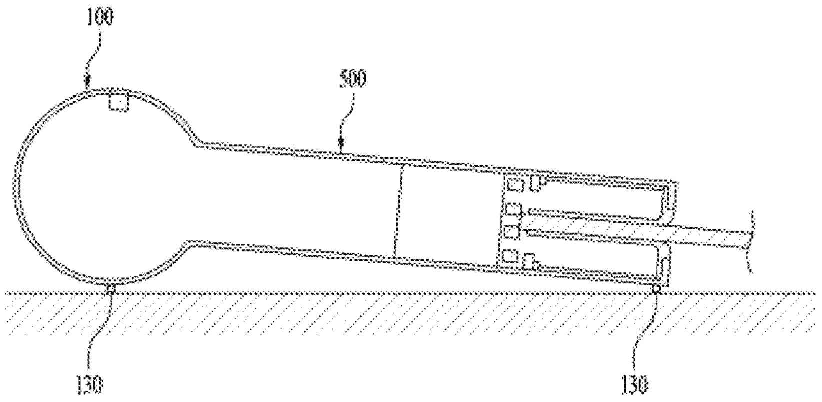

【FIG. 18】
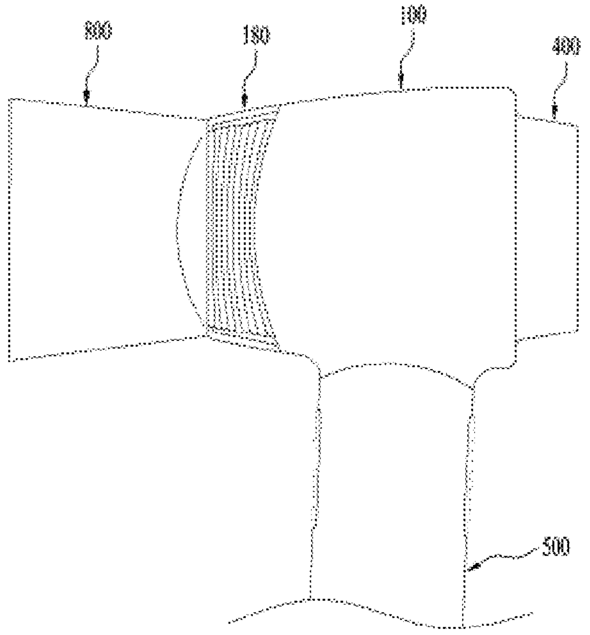

【FIG. 19】
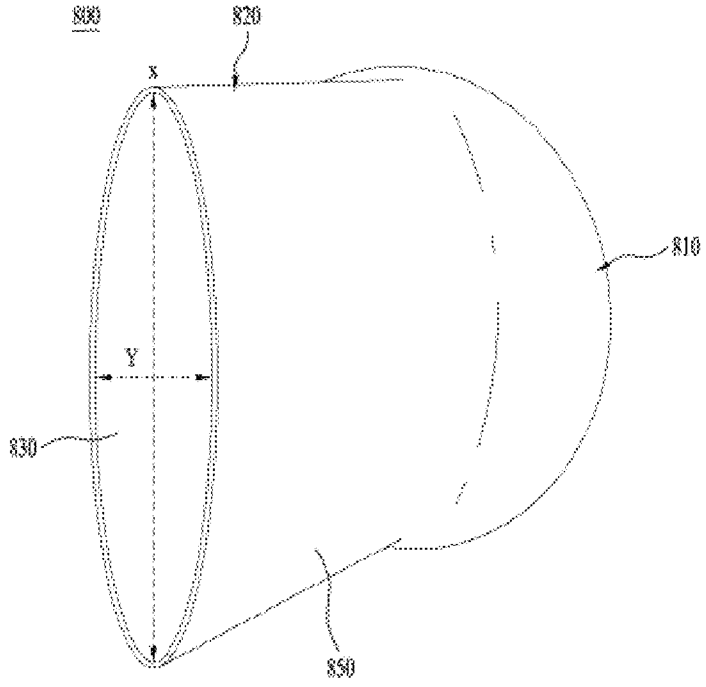

【FIG. 20】
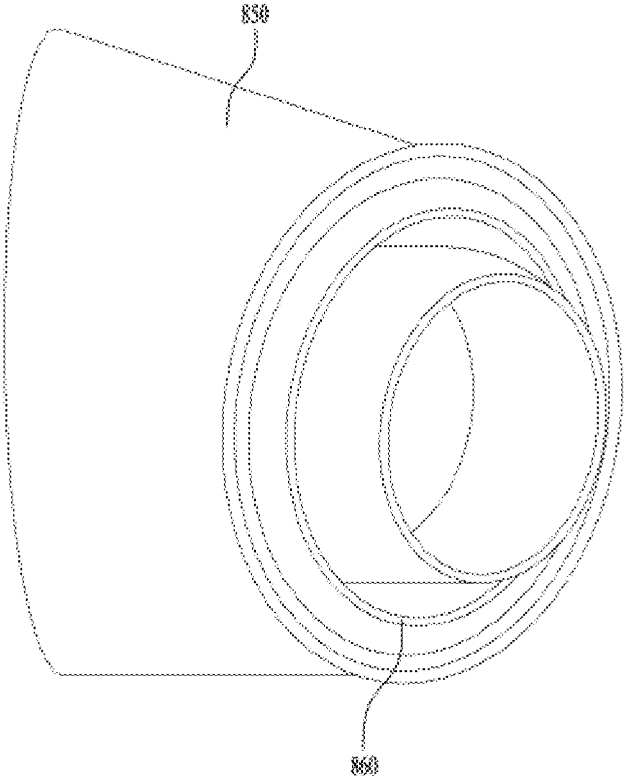

【FIG. 21】
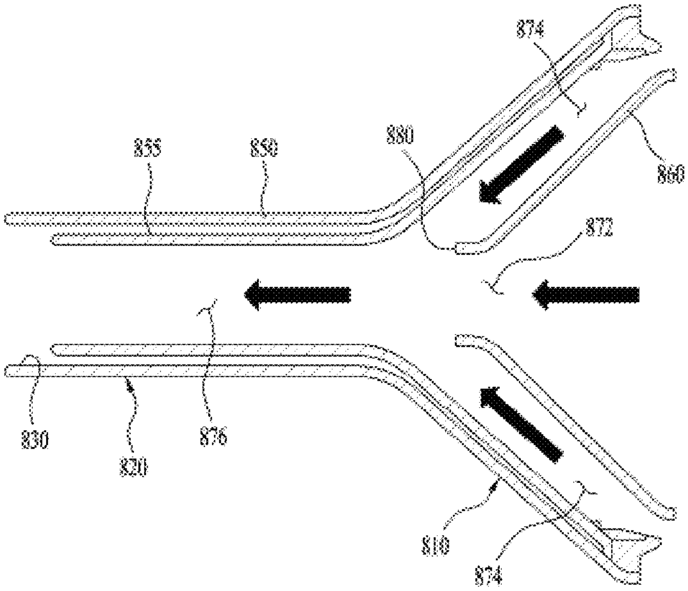

【FIG. 22】
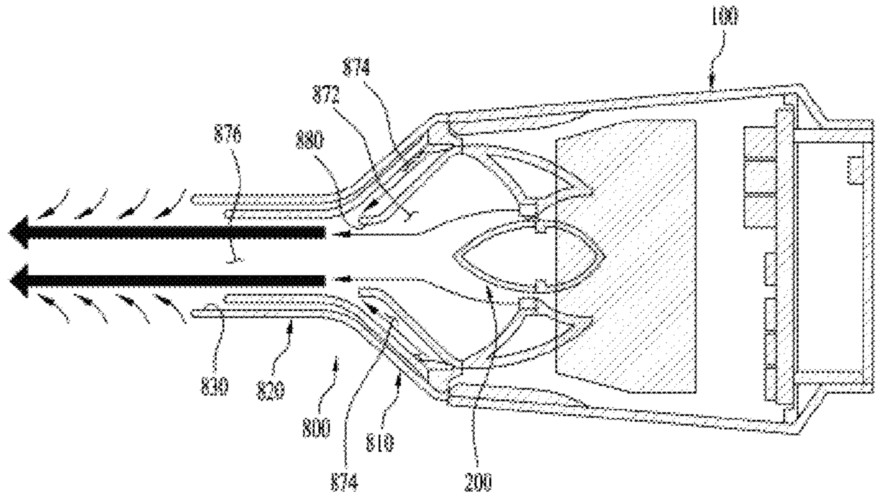

【FIG. 23】
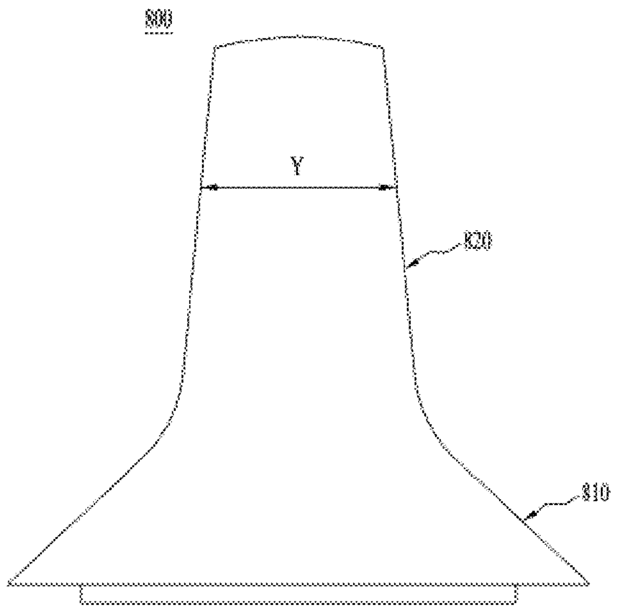

【FIG. 24】
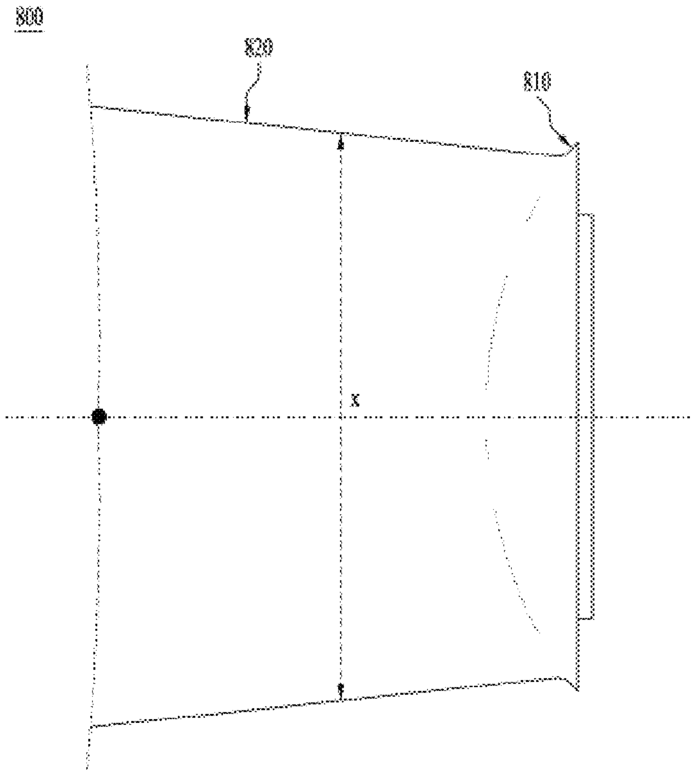

【FIG. 25】
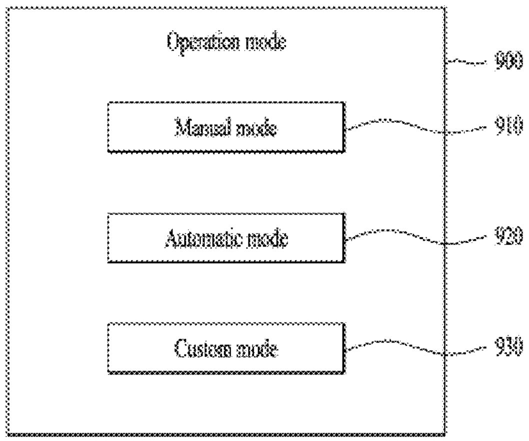

【FIG. 26】
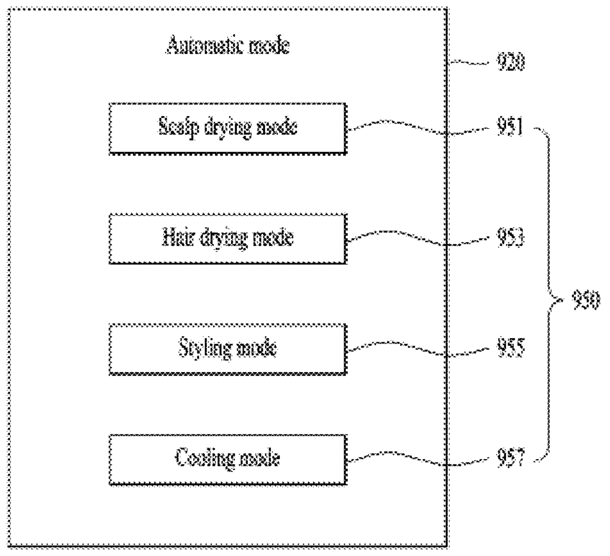

【FIG. 27】
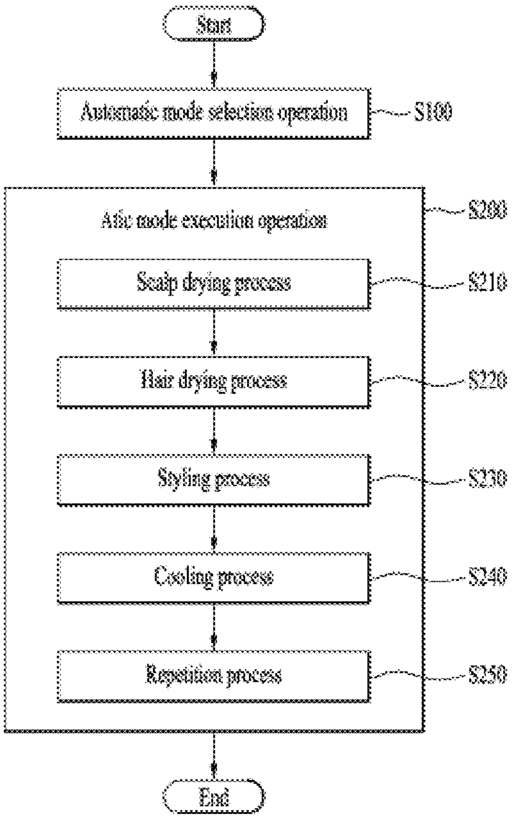

METHOD FOR CONTROLLING HAIR DRYER

CROSS-REFERENCE TO RELATED APPLICATIONS

This application is the National Stage filing under 35 U.S.C. 371 of International Application No. PCT/KR2020/009351, filed on Jul. 16, 2020, which claims the benefit of earlier filing date and right of priority to Korean Application No. 10-2019-0124461, filed on Oct. 8, 2019, the contents of which are all hereby incorporated by reference herein their entirety.

TECHNICAL FIELD

The present disclosure relates to a method for controlling a hair dryer, which relates to a method for controlling a hair dryer in which gas introduced into a gas inlet portion may be discharged through a gas outlet portion.

BACKGROUND ART

When removing water as much as desired from wet human hair or when styling the hair from a current style to a desired style, a hair dryer that discharges gas through a gas outlet portion may be used.

A user needs to receive gas in various states depending on a use situation. However, depending on the situation, it may be cumbersome or inconvenient for the user to adjust the gas state and use the gas in a desired state all the time.

In connection, US Patent Application Publication No. US 2005/0204576 A1 discloses a hair dryer in which a plurality of modes different in a speed and the like of discharge gas. However, in the hair dryer disclosed in US 2005/0204576 A1, in order to change discharge gas characteristics in a hair drying or a styling process, the user must directly identify characteristics of each mode and select a currently required mode.

In consideration of the same, it is an important task to improve ease of use by considering a setting of gas characteristics frequently required by or suitable for the user who uses the hair dryer and providing various gas setting states based on an optimized course.

DISCLOSURE

Technical Problem

Embodiments of the present disclosure are intended to provide a method for controlling a hair dryer that may effectively improve ease of use by automatically providing a plurality of gas settings to a user.

Further, embodiments of the present disclosure are intended to provide a method for controlling a hair dryer in which a gas setting required for a user may be optimized and then provided.

Technical Solution

An embodiment of the present disclosure may provide an automatic mode for optimal hair care. Specifically, an embodiment of the present disclosure may provide an automatic mode in which a plurality of individual modes are automatically executed.

Drying modes optimized for scalp and hair health may be easily switched in stages with a single button, and a styling mode and a cooling mode may be switched alternately.

The individual modes presented in the present disclosure may be selected as an optimized course considering the health of the hair and the scalp based on consulting from a hair expert.

For example, high-speed and low-temperature gas may be provided for scalp drying, high-speed and medium-temperature gas may be provided for hair drying, low-speed and high-temperature gas may be provided for styling, and low-speed and low-temperature gas may be provided for cooling.

In one example, a method for controlling a hair dryer including a main body including a gas outlet portion disposed thereon, a handle extending from the main body, an operation unit disposed on the main body or the handle, wherein one of a plurality of operation modes is able to be selected through the operation unit, a heater disposed inside the main body to adjust a temperature of discharge gas discharged through the gas outlet portion, and a fan disposed inside the main body or the handle to adjust a speed of discharge gas according to an embodiment of the present disclosure may include selecting an automatic mode for manipulating, by a user, the operation unit to select the automatic mode including a plurality of individual modes among the plurality of operation modes, and executing the automatic mode for sequentially executing the plurality of individual modes.

At least one of the temperature and the speed of discharge gas may vary based on the plurality of individual modes, wherein when executing the automatic mode, the heater and the fan may respectively adjust the temperature and the speed of discharge gas based on a setting of each of the plurality of individual modes.

Accordingly, the user may be automatically receive the plurality of individual modes with different discharge gas settings, so that ease of use may be improved.

The plurality of individual modes may include a scalp drying mode and a hair drying mode, wherein the executing of the automatic mode may include a scalp drying operation for adjusting, by the heater, the temperature of discharge gas to a first temperature and adjusting, by the fan, the speed of discharge gas to a first speed based on the scalp drying mode, and a hair drying operation for adjusting, by the heater, the temperature of discharge gas to a second temperature higher than the first temperature and adjusting, by the fan, the speed of discharge gas to the first speed based on the hair drying mode after the scalp drying operation.

The plurality of individual modes may further include a styling mode, wherein the executing of the automatic mode may further include a styling operation for adjusting, by the heater, the temperature of discharge gas to a third temperature higher than the second temperature and adjusting, by the fan, the speed of discharge gas to a second speed lower than the first speed based on the styling mode after the hair drying operation.

The plurality of individual modes may further include a cooling mode, wherein the executing of the automatic mode may further include a cooling operation for adjusting, by the heater, the temperature of discharge gas to a fourth temperature lower than the first temperature and adjusting, by the fan, the speed of discharge gas to a third speed equal to or lower than the second speed based on the cooling mode after the styling operation.

The executing of the automatic mode may further include a repetition operation for repeatedly executing the styling mode and the cooling mode after the cooling operation.

As described above, an embodiment of the present disclosure is effective because the plurality of individual modes optimized for care of scalp and hair of the user may be automatically executed.

The executing of the automatic mode may include executing a next individual mode when an execution time of a currently executed individual mode among the plurality of individual modes is equal to or greater than a reference time preset for the corresponding individual mode.

The executing of the automatic mode may include terminating a currently executed individual mode and then executing a next individual mode when the user selects individual mode switch by manipulating the operation unit.

The hair dryer may further include a lighting portion, wherein the lighting portion may be disposed on the main body to emit light in a plurality of colors, and wherein when executing the automatic mode, the lighting portion may emit light in different colors respectively in the plurality of individual modes.

Accordingly, the user may conveniently and effectively identify a current discharge gas setting, thereby improving the ease of use.

The hair dryer may further include a display, wherein the display may be disposed on the main body to display a current operation state of the hair dryer, and wherein when executing the automatic mode, the display may display a currently executed individual mode and at least one of the temperature and the speed of discharge gas.

When executing the automatic mode, at least a portion of the display may emit light in the same color as the lighting portion.

In one example, a hair dryer according to an embodiment of the present disclosure may include a main body including a gas outlet portion disposed thereon, a handle extending from the main body, an operation unit disposed on the main body or the handle, wherein one of a plurality of operation modes is able to be selected through the operation unit, a heater disposed inside the main body to adjust a temperature of discharge gas discharged through the gas outlet portion, a fan disposed inside the main body or the handle to adjust a speed of discharge gas, and a controller that, when an automatic mode among the plurality of operation modes is selected through the operation unit, controls the heater and the fan to sequentially execute a plurality of individual modes, wherein at least one of the temperature and the speed of discharge gas varies based on the plurality of individual modes.

The hair dryer may further include a lighting portion disposed on the main body to emit light in different colors respectively in the plurality of individual modes.

The hair dryer may further include a display disposed on the main body to display a currently executed individual mode and at least one of the temperature and the speed of discharge gas.

The display may include an individual mode display portion having a shape of a ring extending along a rim of the display, wherein the individual mode display portion may be divided into a plurality of lighting sections along an extension direction.

The plurality of lighting sections may respectively and sequentially correspond to the plurality of individual modes along the extension direction, and wherein the individual mode display portion may be disposed such that n lighting sections from a first lighting section corresponding to an individual mode firstly executed in the automatic mode among the plurality of lighting sections to an n-th lighting section corresponding to a currently executed n-th individual mode are lit.

The handle may include a gas inlet portion disposed at an end thereof in communication with the gas outlet portion, wherein the hair dryer may further include a gas flow path extending from an interior of the handle to an interior of the main body and communicating the gas inlet portion with the gas outlet portion, and wherein the fan may be disposed on the gas flow path inside the handle.

Advantageous Effects

Embodiments of the present disclosure may provide the method for controlling the hair dryer that may effectively improve the ease of use by automatically providing the plurality of gas settings to the user.

Further, embodiments of the present disclosure may provide the method for controlling the hair dryer in which the gas setting required for the user may be optimized and then provided.

Accordingly, discharge gas having a large cross-sectional area may be provided to the user, and the user may dry the hair using gas with a sense of volume. For example, the entire discharge gas with a sense of volume formed through a center hole 230 and a side hole 250 may allow the user to dry a larger area of the hair.

DESCRIPTION OF DRAWINGS

FIG. 1 is a perspective view illustrating a hair dryer according to an embodiment of the present disclosure.

FIG. 2 is an internal cross-sectional view of a hair dryer according to an embodiment of the present disclosure.

FIG. 3 is a view of a gas outlet portion of a hair dryer according to an embodiment of the present disclosure viewed from the outside.

FIG. 4 is a view schematically illustrating discharge gas flow when a side hole is defined in a gas outlet portion.

FIG. 5 is a view schematically illustrating discharge gas flow when a center hole is further defined in a gas outlet portion in FIG. 4.

FIG. 6 is a view schematically illustrating discharge gas flow when a guide cone is further included in a gas outlet portion in FIG. 5.

FIG. 7 is a cross-sectional view illustrating a temperature sensor and a lighting portion of a hair dryer according to an embodiment of the present disclosure.

FIG. 8 is a view of a lighting portion in FIG. 7 viewed from the outside.

FIG. 9 is a view illustrating another embodiment of a lighting portion illustrated in FIG. 8.

FIG. 10 is a view illustrating a display of a hair dryer according to an embodiment of the present disclosure.

FIG. 11 is a view illustrating another embodiment of a display illustrated in FIG. 10.

FIG. 12 is a view illustrating a longitudinal crossing angle of a main body and a handle in a hair dryer according to an embodiment of the present disclosure.

FIG. 13 is a cross-sectional view illustrating an interior of a handle in a hair dryer according to an embodiment of the present disclosure.

FIG. 14 is a view schematically illustrating a state in which a filter is removed from a handle in FIG. 13.

FIG. 15 is a view illustrating an incision of a filter in a hair dryer according to an embodiment of the present disclosure.

FIG. 16 is a view of a wire outlet in a hair dryer according to an embodiment of the present disclosure viewed from the outside.

FIG. 17 is a view illustrating a protection member in a hair dryer according to an embodiment of the present disclosure.

FIG. 18 is a view illustrating a state in which a concentrator is mounted on a hair dryer according to an embodiment of the present disclosure.

FIG. 19 is a perspective view of a concentrator illustrated in FIG. 18.

FIG. 20 is a perspective view of a concentrator of FIG. 19 viewed from the rear.

FIG. 21 is a cross-sectional view of an interior of a concentrator in FIG. 19 viewed from the side.

FIG. 22 is a cross-sectional view of a concentrator in FIG. 19 viewed from the top.

FIG. 23 is a top view illustrating a concentrator in FIG. 19.

FIG. 24 is a side view illustrating a concentrator in FIG. 19.

FIG. 25 is a view illustrating a plurality of operation modes set in a hair dryer according to an embodiment of the present disclosure.

FIG. 26 is a view illustrating a plurality of individual modes included in an automatic mode in FIG. 25.

FIG. 27 is a flowchart of executing an automatic mode in a method for controlling a hair dryer according to an embodiment of the present disclosure.

BEST MODE

Hereinafter, an embodiment of the present disclosure will be described in detail with reference to the accompanying drawings to be easily implemented by those skilled in the art to which the present disclosure belongs.

However, the present disclosure may be implemented in many different forms and may not be limited to the embodiment described herein. Further, in order to clearly describe the present disclosure, components not related to the description are omitted in the drawings, and similar reference numerals are used for similar components throughout the specification.

In this specification, redundant description of the same components is omitted.

Further, in this specification, it will be understood that when a component is referred to as being "connected with" another component, the component may be directly connected with the other component or intervening components may also be present. In contrast, it will be understood that when a component is referred to as being "directly connected with" another component in this specification, there are no intervening components present.

Further, terms used in this specification are only used to describe a specific embodiment, and are not intended to limit the present disclosure.

Further, in this specification, a singular representation may include a plural representation unless it represents a definitely different meaning from the context.

Further, in this specification, terms such as "include", "has", and the like should be understood that they are intended to indicate an existence of features, numbers, steps, operations, components, parts, or combinations thereof described in the specification, but do not preclude the presence or possibility of addition of one or more other features, numbers, steps, operations, components, parts, or combinations thereof in advance.

Further, in this specification, a term 'and/or' includes a combination of a plurality of listed items or one of the plurality of listed items. In this specification, 'A or B' may include 'A', 'B', or 'both A and B'.

FIG. 1 is a perspective view illustrating a hair dryer according to an embodiment of the present disclosure. Further, FIG. 2 is an internal cross-sectional view of a hair dryer according to an embodiment of the present disclosure. A hair dryer according to an embodiment of the present disclosure includes a main body 100 and a handle 500 as shown in FIGS. 1 and 2.

A gas flow path 350 through which gas flows may be defined in the main body 100, and a gas outlet portion 200 through which the gas inside is discharged to outside is disposed. The gas flowing inside the main body 100 may be introduced through a gas inlet portion 550, and the gas inlet portion 550 may be disposed on the main body 100 or the handle 500. When the gas inlet portion 550 is disposed on the handle 500, the gas flow path 350 may be extended from the handle 500 to the main body 100.

The handle 500 extends from the main body 100. FIGS. 1 and 2 illustrate the handle 500 extending downward from the main body 100. The handle 500 may be a portion gripped by a user, and thus may have a shape for improving a convenience of the grip. The extending direction of the handle 500 may vary, but for convenience of description, the direction in which the handle 500 extends from the main body 100 will be described as the downward direction.

The hair dryer according to an embodiment of the present disclosure includes a fan 510 capable of flowing the gas and adjusting a speed of discharge gas discharged through the gas outlet portion 200. The fan 510 may be disposed on the gas flow path 350 to flow the gas, and may be disposed inside the main body 100 or inside the handle 500.

For example, when the gas inlet portion 550 is disposed on the handle 500, the gas flow path 350 may extend from the gas inlet portion 550 of the handle 500 to the gas outlet portion 200 of the main body 100, and the fan 510 may be disposed on the gas flow path 350 defined in the handle 500.

Further, a heater 120 capable of adjusting a temperature of the discharge gas may be disposed inside the main body 100. In FIG. 2, the heater 120 disposed inside the main body 100 is schematically illustrated. The heater 120 may be in a scheme of heating the gas by generating heat by providing current to a coil-shaped resistor.

However, the resistor of the heater 120 may not necessarily be in the shape of the coil, and may be formed in various types, such as a thermoelectric element, capable of heating the gas or adjusting the temperature of the gas.

An operation scheme of the hair dryer according to an embodiment of the present disclosure will be briefly described with gas flow as follows.

First, the user manipulates a power button disposed on the main body 100 or the handle 500. When the power button is turned on, the fan 510 is operated and the gas is introduced into the hair dryer through the gas inlet portion 550.

The gas introduced through the gas inlet portion 550 flows along the gas flow path 350 by the fan 510 toward the gas outlet portion 200, and the discharge gas is discharged from the gas outlet portion 200 and provided to the user.

In this process, a flow speed of the gas on the gas flow path 350 may be adjusted by the fan 510, and the temperature thereof may be adjusted by the heater 120. Adjustment of operation states of the fan 510 and the heater 120 may be performed by the user through manipulation of an operation unit 450, or may be automatically performed based on an operation mode preset in a controller 700.

In one example, FIG. 3 illustrates the gas outlet portion 200 disposed on the main body 100. The main body 100 may have a substantially circular cross-section and may have a length as shown in FIG. 1 or 3. However, the shape of the cross-section of the main body 100 may be various as needed.

In one example, the gas outlet portion 200 of the hair dryer according to an embodiment of the present disclosure will be described in detail with reference to FIG. 3.

At least a portion of the gas flow path 350 is defined in the main body 100, and one side of the main body 100 is opened. The opened one side of the main body 100 may be in communication with the gas flow path 350. In one example, the gas outlet portion 200 may be disposed on the main body 100 to shield the opened one side of the main body 100.

The opened one side of the main body 100 may correspond to an end of the gas flow path 350. Further, the gas flowing along the gas flow path 350 may be simultaneously delivered to a center hole 230 and a side hole 250 and discharged to the outside.

A shape of the main body 100 may vary, but FIGS. 1 and 2 illustrate a shape of the main body 100 having the circular cross section and the length. Hereinafter, for convenience of description, the main body 100 will be described based on a shape having the length by extending in front and rear directions and having the substantially circular cross-section, as shown in FIG. 1.

The opened one side of the main body 100 may be at various positions, but may correspond to a front surface as shown in FIG. 2, and the gas outlet portion 200 may be disposed to shield the opened one side while forming the front surface of the main body 100, as shown in FIG. 3.

In an embodiment of the present disclosure, the gas outlet portion 200 may include the center hole 230 and the side hole 250 defined therein as shown in FIG. 3. The center hole 230 and the side hole 250 correspond to discharge holes through which the gas is discharged from the gas outlet portion 200.

The center hole 230 may be defined at a center of the gas outlet portion 200, and a shape thereof may be circular. However, the shape of the center hole 230 may be a polygonal shape such as a square and the like as needed, and a size of a diameter may also be varied as needed.

The side hole 250 may be defined to surround the center hole 230. For example, as shown in FIG. 3, the center hole 230 may be defined in a substantially circular shape at the center of the gas outlet portion 200, and the side hole 250 may be a ring-shaped opening in which the center hole 230 is defined at a center thereof.

In the present disclosure, the ring shape may be understood as an extended shape forming a closed curve. Accordingly, the ring shape may be defined as a closed cross-section that is surrounded by the closed curve. For example, FIG. 3 discloses the side hole 250 having a circular ring shape, and the circular ring shape may have a circular closed cross-section.

The ring shape may not necessarily be circular, and may be, for example, a polygonal ring shape such as a triangle, a square, or the like. That is, in an embodiment of the present disclosure, the side hole 250 may have the circular ring or the polygonal ring shape. FIG. 3 illustrates the side hole 250 having the substantially circular ring shape.

Further, the center hole 230 and the side hole 250 may be in communication with the same gas flow path 350 together. Referring to FIG. 2, there is one gas flow path 350 extending from the handle 500 inside the main body 100. The center hole 230 and the side hole 250 of the gas outlet portion 200 may be in communication with the gas flow path 350 together and simultaneously discharge the gas.

Discharge gas discharged from the side hole 250 may form a volume for the entire discharge gas discharged through the gas outlet portion 200. That is, a cross-sectional area of the entire discharge gas may correspond to a size of the closed cross-section defined by the side hole 250.

However, the discharge gas of the side hole 250 may be diffused while being flowed, and a portion of the gas flow may be distributed toward a center on the cross-section where the gas is not discharged by the side hole 250, and thus, the cross-sectional area of the discharge gas may be reduced.

Accordingly, in an embodiment of the present disclosure, the center hole 230 is defined at a center of the side hole 250, and the phenomenon in which the discharge gas of the side hole 250 is distributed toward the center on the cross-section is suppressed by discharge gas of the center hole 230.

That is, the discharge gas of the center hole 230 flows from the center on the cross-section of the entire discharge gas of the gas outlet portion 200, and suppresses the discharge gas of the side hole 250 from being distributed toward the center during the flow process, so that it may be advantageous for the entire discharge gas to maintain an initial cross-sectional area thereof.

Accordingly, discharge gas having a large cross-sectional area may be provided to the user, and the user may perform dry using the bulky gas. For example, the entire discharge gas with the volume formed through the center hole 230 and the side hole 250 may allow the user to perform the dry in a larger area.

Further, in an embodiment of the present disclosure, because the center hole 230 and the side hole 250 are in communication with one gas flow path 350, the gas flow paths 350 respectively for the center hole 230 and the side hole 250 may not separately formed. Thus, it may be advantageous in terms of design and may be efficient in providing three-dimensional discharge gas to the user.

Referring to FIGS. 2 and 3, in an embodiment of the present disclosure, the gas outlet portion 200 further includes a base 210 coupled to the opened one side of the main body 100. The center hole 230 may be defined at a center of the base 210, and the side hole 250 may be defined between an outer circumferential surface of the base 210 and an outer wall of the main body 100.

FIG. 3 illustrates the base 210 coupled to the opened one side of the main body 100. The base 210 may be disposed to correspond to an opened shape of the one side of the main body 100, but may not be limited thereto and may be formed in various shapes or materials.

For example, the base 210 may be disposed to be partially different from the shape of the opened one side of the main body 100 to determine the shape of the side hole 250, and may be molded with a material the same as or different from a material of the outer wall of the main body 100.

The base 210 may constitute an entirety or a portion of one surface of the main body 100, for example, a front surface of the main body 100 as shown in FIG. 3, so that the center hole 230 may be defined at the center of the base 210 and the side hole 250 may be defined between the outer circumferential surface of the base 210 and the outer wall of the main body 100.

The base 210 may be coupled to an opening of the main body 100 in various schemes, such as a scheme using a plurality of coupling ribs, and may be integrally molded with the main body 100.

In one example, as shown in FIG. 3, in an embodiment of the present disclosure, the base 210 may have a shape of being indented toward an interior of the main body 100 from the side hole 250 toward the center hole 230.

A center of a front surface of the base 210 may be indented toward the interior of the main body 100, so that the front surface of the base 210 may form a curved surface. Accordingly, the discharge gas of the center hole 230 on the flow path of the discharge gas discharged to the gas outlet portion 200 may be discharged upstream from the discharge gas of the side hole 250.

When the discharge gas of the center hole 230 on the flow path of the entire discharge gas starts to be diffused before the discharge gas of the side hole 250, an effect in which the discharge gas of the center hole 230 with an increased cross-sectional area suppresses the discharge gas of the side hole 250 from being flowed or discharged toward the center may be increased.

Further, the front surface of the base 210 constituting a portion of a space in which the discharge gas of the center hole 230 is diffused forms the curved surface, so that it may be advantageous in preventing formation of unnecessary turbulence. A curvature of the curved surface formed by the front surface of the base portion may be variously set as necessary.

In one example, an embodiment of the present disclosure may further include a guide cone 270 disposed at a center of the center hole 230 and guiding the flow of the gas discharged through the center hole 230. The gas may be discharged between an inner surface of the center hole 230 and the guide cone 270.

FIG. 3 illustrates the guide cone 270 disposed at the center of the center hole 230. As the guide cone 270 is disposed, the discharge gas of the center hole 230 is discharged into a space between the inner surface of the center hole 230 and an outer surface of the guide cone 270.

When the guide cone 270 is disposed at the center of the center hole 230, the center hole 230 may correspond to a ring-shaped discharge hole. That is, the discharge gas of the center hole 230 may have a ring-shaped cross-section and may be discharged from the center hole 230.

As described above, the discharge gas of the center hole 230 may contribute to suppressing the reduction of the cross-sectional area resulted from the discharge gas of the side hole 250 that flows toward the center in the flow process. In addition, an embodiment of the present disclosure may increase a level at which the discharge gas of the center hole 230 diffuses outward from the cross-section by disposing the guide cone 270 at the center of the center hole 230.

When the cross-sectional area of the discharge gas of the center hole 230 is increased as the guide cone 270 is disposed, the effect of suppressing the phenomenon in which the discharge gas of the side hole 250 flows inward of the cross-section may be increased.

In one example, in the guide cone 270, one end 271 protruding toward the gas flow path 350 and the other end 273 protruding in a discharge direction of the gas of the center hole 230 may respectively have conical shapes.

The conical shape means a shape in which a cross-section has a circular shape and a diameter of the circle gradually decreases as a length increases.

However, in the conical shape, the circular shape may include a shape other than a definite circular shape such as an ellipse and the like, and the reduction in the diameter may not necessarily be constant, for example, a diameter reduction rate may gradually increase or gradually decrease.

However, FIGS. 2 and 3 illustrate the guide cone 270 having a conical shape forming a gentle curved surface according to an embodiment of the present disclosure, and FIG. 2 illustrates one end 271 and the other end 273 of the guide cone 270.

The effects of the center hole 230 and the guide cone 270 on the discharge gas will be described with reference to FIGS. 4 to 6.

First, FIG. 4 illustrates an example in which the side hole 250 is defined in the base 210 except for the center hole 230. Referring to FIG. 4, a state in which at least a portion of the discharge gas of the side hole 250 flows toward the center in the flow process is schematically illustrated.

Accordingly, the cross-sectional area of the discharge gas of the side hole 250 may be gradually reduced as the flow process proceeds.

In one example, FIG. 5 illustrates an example in which the center hole 230 is defined along with the side hole 250 in the base 210 and the guide cone 270 in which one end does not protrude is disposed. A cross-section shape at an initial stage of the discharge of the discharge gas of the center hole 230 in FIG. 5 has a ring shape.

Referring to FIG. 5, it is schematically illustrated that the discharge gas of the center hole 230 flows at the center of the entire discharge gas, and an amount of the discharge gas of the side hole 250 diffusing or flowing toward the center is reduced by the discharge gas of the center hole 230.

Furthermore, as the discharge gas of the center hole 230 is discharged in the ring shape, the discharge gas of the center hole 230 may have a stronger air pressure than the discharge gas of the side hole 250 in the simple circular shape. Thus, the discharge gas of the center hole 230 may be more advantageous to suppress the discharge gas of the side hole 250 from flowing toward the center of the cross-section.

In one example, in FIG. 6, an example in which the center hole 230 and the side hole 250 are defined in the base 210 and each of one end 271 and the other end 273 of the guide cone 270 disposed in the center hole 230 has the conical shape is illustrated.

Referring to FIG. 6, the flow of the gas from the interior of the main body 100 toward the center hole 230 may be induced to a rim of the center hole 230 by the other end 273 of the guide cone 270 and the formation of the turbulence may be suppressed.

Further, as one end 271 of the guide cone 270 protrudes in the conical shape, an effect in which the discharge gas of the center hole 230 is concentrated toward the rim of the center hole 230 increases. Thus, the effect of suppressing the discharge gas of the side hole 250 from flowing toward the discharge gas of the center hole 230 may be further increased.

An outer circumferential surface of the guide cone 270 may have a shape corresponding to an inner circumferential surface of the center hole 230, and a separation distance between the outer circumferential surface of the guide cone 270 and the inner circumferential surface of the center hole 230 may be varied as needed.

Further, the guide cone 270 may be made of a material the same as or different from the material of the base 210, and a curvature of the outer surface thereof may be variously designed as needed.

In one example, the gas outlet portion 200 may further include a guide ring 235. The guide ring 235 may be disposed on the inner surface of the center hole 230 and protrude in the discharge direction of the gas of the center hole 230 to guide the gas flow together with the guide cone 270. FIG. 3 illustrates that the guide hole 270 and the guide ring 235 are provided in the center hole 230.

The guide ring 235 may have a ring shape extending along the rim of the center hole 230, and may be integrally molded with the base 210 or molded separately from the base 210 to be coupled to the inner circumferential surface of the center hole 230.

The guide ring 235 may protrude outward from the center hole 230 or the base 210 based on the gas discharge direction. The flow of the discharge gas of the center hole 230 may be concentrated between the guide cone 270 and the guide ring 235 by the guide cone 270 and the guide ring 235 protruding from the center hole 230.

A protruding end of the guide ring 235 may have a curved shape to facilitate the gas flow. A diameter of the guide ring 235 may be different for each portion, and the shape thereof may also be varied as needed.

In one example, the hair dryer according to an embodiment of the present disclosure may further include a temperature sensor 170 disposed on the rim of the gas outlet portion 200 to measure a temperature of the discharge gas. In FIG. 7, a cross-section of the temperature sensor 170 disposed inside the main body 100 is illustrated.

Specifically, the temperature sensor 170 may be disposed on the rim of the gas outlet portion 200. The temperature sensor 170 may be coupled to an interior of the outer wall of the main body 100 to which the gas outlet portion 200 is coupled, or coupled to the rim of the gas outlet portion 200 and coupled to the main body 100 together with the gas outlet portion 200.

The temperature sensor 170 may be formed in a ring shape extending along the rim of the gas outlet portion 200, or may be disposed on one side of the rim of the gas outlet portion 200. The temperature sensor 170 may be formed in various types, and a size and an arrangement thereof may also be varied as needed.

FIG. 7 illustrates a cross-section in which the ring-shaped temperature sensor 170 extending along the rim of the gas outlet portion 200 according to an embodiment of the present disclosure is disposed on the rim of the gas outlet portion 200 or inside the outer wall of the main body 100.

The temperature sensor 170 may be signally connected to the controller 700 embedded in the hair dryer. The controller 700 may be installed at various locations as needed. In FIG. 2, the controller 700 may be disposed on a PCB installed inside the main body 100 to be adjacent to a rear surface.

The temperature sensor 170 may be disposed at a front side of the main body 100 and disposed adjacent to the gas outlet portion 200, or may be disposed to surround the gas outlet portion 200 as shown in FIG. 4. In an embodiment of the present disclosure, the temperature sensor 170 may measure the temperature of the discharge gas discharged from the gas outlet portion 200.

When the temperature sensor 170 measures the temperature of the introduced gas at the gas inlet portion 550 or the gas flowing through the gas flow path 350, an actual temperature of the discharge gas may be different from a currently required temperature depending on a temperature of outdoor air.

Accordingly, in an embodiment of the present disclosure, the temperature sensor 170 may be disposed to measure the temperature of the discharge gas of the gas outlet portion 200, an operation situation of the heater 120 may be adjusted such that the temperature of the discharge gas corresponds to the currently required temperature even when the temperature of the outdoor air changes.

In one example, in an embodiment of the present disclosure, the heater 120 may be disposed rearward of the gas outlet portion 200 and the temperature sensor 170. That is, the heater 120 may be spaced apart from the temperature sensor 170.

The heater 120 is means for providing the heat, Accordingly, when a temperature of the heater 120 affects the temperature sensor 170, an accuracy of a temperature measurement value of the discharge gas measured by the temperature sensor 170 may be lowered.

In consideration of this, in an embodiment of the present disclosure, the temperature sensor 170 may be disposed on the rim of the gas outlet portion 200 to measure the temperature of the discharge gas, and the heater 120 may be disposed rearward of the gas outlet portion 200 or the temperature sensor 170 to be spaced apart from the temperature sensor 170.

In one example, an embodiment of the present disclosure may include a lighting portion 180 disposed on the main body 100 to emit light, and light emission characteristics of the lighting portion 180 may be adjusted differently based on characteristics of the gas discharged from the gas outlet portion 200.

FIG. 7 illustrates a cross-section of the lighting portion 180 disposed on the main body 100 according to an embodiment of the present disclosure, and FIG. 8 illustrates an exterior of the lighting portion 180 disposed on the main body 100 according to an embodiment of the present disclosure.

The lighting portion 180 may include a light source 185 that emits the light, the light source 185 may include at least one light source body, and the light source body may be various types, such as an LED element and the like.

In an embodiment of the present disclosure, the gas characteristics may include a temperature and a speed of the gas and other characteristics of the gas, and the light emission characteristics of the lighting portion 180 may include a color or an amount of the light provided from the lighting portion 180 and other characteristics of the light.

The user is desired to adjust the gas characteristics such as the temperature or the speed of the discharge gas currently provided through the gas outlet portion 200 to a desired state. Further, easily identifying the gas characteristics of the current discharge gas may increase a convenience in using the hair dryer.

An embodiment of the present disclosure provides the lighting portion 180 having the different light emission characteristics such as the color, the light amount, or the like based on the temperature, the speed, or the like of the discharge gas, so that the user may easily and conveniently identify the state of the discharge gas currently provided.

The lighting portion 180 may be disposed on the main body 100, the light is emitted by being exposed to the outside such that the user may easily recognize the light emission characteristics, and a shape thereof may be varied as needed.

FIG. 8 illustrates the ring-shaped lighting portion 180 extending along a circumference of the main body 100 according to an embodiment of the present disclosure. FIG. 9 illustrates the lighting portion 180 extending in a longitudinal direction of the main body 100 as a variant.

Referring to FIG. 8, in an embodiment of the present disclosure, the lighting portion 180 may have the ring shape extending along the circumference of the main body 100 and may form a portion of the outer wall of the main body 100.

Because the lighting portion 180 extends along the circumference of the main body 100, the user may identify the light emission characteristics of the lighting portion 180 even at various angles. Further, the lighting portion 180 extends along the circumference of the main body 100 while having the ring shape such that the lighting portion 180 corresponds to the exterior of the main body 100, so that a sense of difference that the user may have as the lighting portion 180 is disposed on the main body 100 may be reduced.

Furthermore, in an embodiment of the present disclosure, as the lighting portion 180 is disposed to constitute the portion of the outer wall of the main body 100, the sense of difference of the user may be further reduced. In addition, because a protrusion by the lighting portion 180 does not exist, it may be advantageous to use the hair dryer, and damage such as collision and the like may be reduced.

Referring again to FIG. 7, in the hair dryer according to an embodiment of the present disclosure, the lighting portion 180 may include the light source 185 and a lighting cover 190.

The light source 185 may be disposed inside the main body 100 and emit the light, the lighting cover 190 may constitute the portion of the outer wall of the main body 100 and shield the light source 185, and the light of the light source 185 may be transmitted to the outside.

The light source 185 may include the at least one light source body whose light emission characteristics may be adjusted differently. For example, the light source 185 may emit light beams in a plurality of colors, and accordingly, the lighting portion 180 may be disposed to emit different light beams based on the gas temperature.

In one example, the lighting cover 190 may be disposed to cover the light source 185 and may form the exterior of the lighting portion 180. Further, the lighting cover 190 may be coupled to the main body 100 to be the portion of the outer wall of the main body 100 as shown in FIG. 8. The lighting cover 190 may be molded integrally with the outer wall of the main body 100 or manufactured separately from the outer wall of the main body 100 and coupled to the main body 100.

The lighting cover 190 may shield the light source 185 to protect the light source 185 from an external impact, and may be disposed to determine a scattering degree or a direction of the light when necessary.

Further, in order for the light of the light source 185 to be recognized by the user from the outside, the lighting cover 190 is disposed such that the light of the light source 185 may be transmitted therethrough. The lighting cover 190 may be formed transparently or translucently, or may have an intrinsic color.

FIG. 8 illustrates the lighting cover 190 made of a plastic-based material, formed to be colorless and transparent, and extended along the circumference of the main body 100 according to an embodiment of the present disclosure.

In one example, in an embodiment of the present disclosure, the lighting portion 180 may emit the light beams in the different colors based on the temperature of the gas discharged through the gas outlet portion 200. That is, the color, as one of the light emission characteristics, of the lighting portion 180 may be changed based on the temperature of the gas, as one of the gas characteristics.

In an embodiment of the present disclosure, the temperature sensor 170 and the lighting portion 180 may be electrically and signally connected to the controller 700, and the controller 700 may store a color of the light emitted from the lighting portion 180 for each preset temperature or each temperature section.

In this embodiment, the controller 700 may control the lighting portion 180 such that the lighting portion 180 emits the light in a preset color based on the current discharge gas temperature. However, even when the controller 700 is not disposed, the color of the lighting portion 180 may be different based on the gas temperature in physical and mechanical schemes.

For example, when the temperature of the discharge gas is between 20° C. and 35° C., preferably between 25° C. and 30° C., for example, 28° C., the lighting portion 180 may emit the light in blue or sky blue.

When the temperature of the discharge gas is between 35° C. and 50° C., preferably between 35° C. and 45° C., for example, 40° C., the lighting portion 180 may emit the light in yellow.

When the temperature of the discharge gas is between 50° C. and 70° C., preferably between 55° C. and 65° C., for example, 60° C., the lighting portion 180 may emit the light in orange.

When the temperature of the discharge gas is between 80° C. and 100° C., preferably between 90° C. and 100° C., for example, 90° C. or 100° C., the lighting portion 180 may emit the light in red.

The temperature or temperature section of the discharge gas and the color of the lighting portion 180 may be variously set as needed. As in the previous example, in an embodiment of the present disclosure, the lighting portion 180 may emit the light in a different color based on the temperature of the discharge gas to conveniently provide information on the current temperature of the gas to the user.

In one example, in an embodiment of the present disclosure, the lighting portion 180 may have a different amount of light depending on the speed of the gas discharged through the gas outlet portion 200.

For example, in an embodiment of the present disclosure, as the speed of gas discharged through the gas outlet portion 200 increases, a length of a portion of the light source 185 emitting the light along the longitudinal direction of the main body 100 may increase.

The speed of the discharge gas may be determined experimentally or statistically based on an operation situation of the fan 510, and the amount of light of the lighting portion 180 may be increased in the same range or the light emitting portion itself may be increased.

For example, in the case of the lighting portion 180 illustrated in FIGS. 7 and 8, the light emitting portion of the light source 185 may be increased along the longitudinal direction of the main body 100. In the case of the lighting portion 180 illustrated in FIG. 9, the light emitting portion of the light source 185 may also be increased along the longitudinal direction of the main body 100. Referring to FIG. 8, in the lighting portion 180 according to an embodiment of the present disclosure, when the speed of discharge gas is increased, the length of the light emitting portion may be increased from A to B.

When the length of light emitting portion of the light source 185 is increased, the user may recognize that the length of the light emitting portion of the lighting portion 180 illustrated in FIG. 8 or 9 is increased, and accordingly effectively and easily recognize the speed of the discharge gas.

Alternatively, in the lighting portion 180 illustrated in FIGS. 7 to 9, the light emitting portion may be constant, but the amount of light itself may be increased.

In the light source 185, the number of light source bodies that emit the light may be increased or the amount of light may be increased by increasing the power provided to the light source body.

Accordingly, an embodiment of the present disclosure may conveniently inform the user of the speed of the discharge gas, and the user may easily identify the current discharge gas speed through the light amount of the lighting portion 180.

In one example, in an embodiment of the present disclosure, the lighting cover 190 may include an inner cover 192 and an outer cover 194. The inner cover 192 may have an inner surface facing the light source 185 and an outer cover 194 may surround the inner cover 192 and constitute the portion of the outer wall of the main body 100. FIG. 7 illustrates cross-sections of the inner cover 192 and the outer cover 194.

In an embodiment of the present disclosure, the inner cover 192 may correspond to a primary cover that covers the light source 185, and the outer cover 194 may be a secondary cover that covers the inner cover 192.

In the lighting cover 190, as the inner cover 192 and the outer cover 194 are formed separately, only the outer cover 194 may be replaced in case of exterior damage, and only the inner cover 192 may be replaced in case of a defect of the light source 185 and the like, so that it may be advantageous for maintenance and repair.

Further, the inner cover 192 and the outer cover 194 may have different transmittances or scattering degrees of the light. Accordingly, characteristics of the light emitted from the lighting portion 180 may be determined based on needs, which may be advantageous.

Further, as the lighting cover 190 has a dual structure of the inner cover 192 and the outer cover 194, it may be advantageous for impact protection and a heat insulation performance may be improved.

Furthermore, a separation space may be defined between the inner cover 192 and the outer cover 194 as shown in FIG. 7. When the separation space is defined between the inner cover 192 and the outer cover 194, it may be advantageous to protect the light source 185 from the impact, and furthermore, the heat from the light source 185 may be effectively suppressed from being transferred to the outside.

In one example, as shown in FIG. 7, in an embodiment of the present disclosure, the inner cover may have a scattering pattern for scattering the light on an outer surface thereof.

An embodiment of the present disclosure may effectively inform the gas characteristics of the discharge gas, such as the temperature and the speed of discharge gas, to the user through the lighting portion 180, and form the scattering pattern on the inner cover 192 to increase a range in which the light of the lighting portion 180 is transmitted to the user or to increase a recognition rate with a rich amount of light.

Accordingly, for example, light provided from a plurality of light emitting elements, such as the LED element disposed in the light source 185, may have a strong linearity. Accordingly, the recognition rate of the user out of a certain direction or a certain range from the main body 100 with respect to the light of the lighting portion 180 may be lowered.

When the scattering pattern is formed on the outer surface of the inner cover 192 covering the light source 185 as in an embodiment of the present disclosure, the scattering degree of the light provided from the light source 185 increases. Accordingly, the recognition rate of the user with respect to the light of the lighting portion 180 may be effectively increased.

Further, because an embodiment of the present disclosure forms the scattering pattern on the inner cover 192 that is shielded by the outer cover 194, the scattering pattern may be effectively prevented from being damaged by an external friction or an external impact in a process of use.

The scattering pattern may be variously formed. For example, the scattering pattern may be formed by performing a chemical or physical etching process on the outer surface of the inner cover 192, or the scattering pattern may be formed by molding or processing various patterns such as a lattice, a straight line, or the like.

FIG. 7 is a view in which the scattering pattern is formed by forming a plurality of protruding portions 193 on the outer surface of the inner cover 192. Referring to FIG. 7, an embodiment of the present disclosure includes the protruding portions 193 having a ring shape extending along a circumference of the inner cover 192. Further, the scattering pattern may be formed by arranging the plurality of protruding portions 193 along the longitudinal direction of the main body 100.

Specifically, as shown in FIGS. 7 and 8, the lighting portion 180 may have the ring shape extending along the circumference of the main body 100, and the protruding portion 193 may protrude from the outer surface of the inner cover 192 in the ring shape extending along the circumference of the inner cover 192 as shown in FIG. 7.

A protruding direction of the protruding portion 193 may not be necessarily perpendicular to the outer surface of the inner cover 192, and may be varied as necessary.

The plurality of protruding portions 193 are arranged along the longitudinal direction of the main body 100 at predetermined spacings on the inner cover 192. In this case, transmittances of the light passing through the inner cover 192 may be different at protruded and non-protruded portions, and the light scattering may be achieved by refraction and the like of the light by the protruding portions 193.

In FIG. 7, the plurality of protruding portions 193 are arranged on the outer surface of the inner cover 192 along the longitudinal direction of the main body 100 to form the scattering pattern. A protruded height, the protruding direction, the number, and the like of the protruding portions 193 may be varied as needed.

In one example, referring to FIG. 8, in an embodiment of the present disclosure, the main body 100 may form a diameter reduction section in which a diameter of the outer wall is reduced toward the gas discharge hole in at least some sections along the longitudinal direction, and the lighting portion 180 may be disposed in the diameter reduction section.

As shown in FIG. 2, the diameter of the outer wall may be reduced uniformly along the longitudinal direction, so that the cross-section thereof may form a straight line. Alternatively, as shown in FIGS. 7 and 8, a diameter reduction rate increases along the longitudinal direction, so that the outer wall may form a curved surface.

The lighting portion 180 may be disposed such that the outer cover 194 achieves the same diameter reduction as the outer wall of the main body 100 in the diameter reduction section. Accordingly, in an embodiment of the present disclosure, structural stability of the main body 100 may be improved.

In one example, referring again to FIG. 2, an embodiment of the present disclosure may further include a display 400 disposed on the main body 100. FIGS. 8 and 9 illustrate the display 400 disposed on the main body 100 at the opposite side of the gas outlet portion 200. FIG. 10 illustrates the display 400 according to an embodiment of the present disclosure. In addition, FIG. 11 illustrates a variant of the display 400 illustrated in FIG. 10.

In an embodiment of the present disclosure, the display 400 is disposed on the main body 100 and includes a temperature display portion 410 in which the temperature of the discharge gas is displayed. The temperature display portion 410 may change in a color based on the temperature of the discharge gas.

Specifically, as shown in FIGS. 10 and 11, the display 400 may have an output panel on which various information is visually displayed. The panel may be various such as an LCD, an LED, and the like. The display 400 in FIGS. 10 and 11 includes an LED display on which the various information is displayed according to an embodiment of the present disclosure. A lighting color of the display 400 to be described later may refer to a color of the corresponding information displayed on the panel.

The gas characteristics of the discharge gas and a current operation mode 900 of the hair dryer may be displayed. For example, the display 400 may include the temperature display portion 410 displaying the temperature of the discharge gas, a speed display portion 412 displaying the speed of the discharge gas, and an operation mode display portion 414 displaying an operation mode of the hair dryer.

Further, in an embodiment of the present disclosure, a plurality of individual modes 950 are included in an automatic mode 920 among the plurality of operation modes 900. The display 400 may include an individual mode display portion 416 displaying the currently executed individual mode 950 when the automatic mode 920 is executed.

Referring to FIG. 10 in which the display 400 according to an embodiment of the present disclosure is illustrated, the display 400 may be formed in a circular shape to correspond to the cross-section shape of the main body 100 and may be disposed on the rear surface.

In the display 400 in FIG. 10, the temperature display portion 410 is disposed at a central portion of the display 400, and the operation mode display portion 414 in which a light emitting element corresponding to the current operation mode among the plurality of operation modes 900 is lit is disposed above the temperature display portion 410. The operation mode display portion 414 may further include a portion indicating the current operation mode as a character as shown in FIG. 10.

Further, the speed display portion 412 in which the number of light emitting elements is adjusted based on the speed of the discharge gas is disposed below the temperature display portion 410. In one example, the ring-shaped individual mode display portion 416 surrounding the temperature display portion 410 is illustrated.

According to an embodiment of the present disclosure, the individual mode display portion 416 illustrated in FIG. 10 may have the ring shape extending along a rim of the display 400, and may be divided into a plurality of lighting sections respectively corresponding to the plurality of individual modes 950 along an extending direction. Lighting sections from a first lighting section indicating an individual mode 950 that is firstly executed in the automatic mode 920 to an n-th lighting section indicating a currently executed individual mode 950 may be lit.

For example, in the individual mode display portion 416 illustrated in FIG. 10, the ring shape is divided into four lighting sections to correspond to four individual modes 950 included in the automatic mode 920. In addition, FIG. 10 illustrates that first and second lighting sections are lit as a second individual mode 950 is currently in progress.

In one example, referring to FIG. 11 illustrating the variant of the display 400 illustrated in FIG. 10, the temperature display portion 410 is disposed at the center, the speed display portion 412 is disposed at both sides of the temperature display portion 410, the operation mode display portion 414 is disposed above the temperature display portion 410, and the individual mode display portion 416 is disposed below the temperature display portion 410.

The arrangement structures of the display 400 illustrated in FIGS. 10 and 11 are only for understanding of the present disclosure, and the arrangements, display schemes, or the like of the temperature display portion 410 and the like in the display 400 may be various. The number or characteristics of the plurality of operation modes 900 and the plurality of individual modes 950 that may be preset in the controller 700 may be variously set as needed.

In one example, an embodiment of the present disclosure may further include an operation unit 450 disposed on the main body 100 and through which one of the plurality of operation modes 900 is selectable.

An embodiment of the present disclosure may include the plurality of operation modes 900 that may improve a convenience of manipulation of the user and utilization of the hair dryer, and the plurality of operation modes 900 may be previously stored in the controller 700.

Further, the operation unit 450 through which one of the plurality of operation modes 900 is selectable may be disposed such that the user may select a desired operation mode among the plurality of operation modes 900 to use the hair dryer. Further, the portion 450 may be formed in various types and shapes.

For example, the operation unit 450 may be formed of a plurality of buttons or a rotary dial to select one of the plurality of operation modes 900, and may further include additional buttons or selecting means.

Further, the operation unit 450 may be disposed on the main body 100 or disposed on the handle 500 to be provided to the user, and the plurality of buttons or manipulation means may be distributed on the main body 100 and the handle 500.

In an embodiment of the present disclosure, the operation unit 450 may include a ring-shaped dial surrounding the rim of the display 400. FIGS. 10 and 11 illustrate the dial-type operation unit 450 surrounding the rim of the display 400.

When the operation unit 450 is formed in the dial type surrounding the display 400 as shown in FIGS. 10 and 11, the user may manipulate the dial while identifying the display 400, thereby improving the manipulation convenience.

Further, as the shapes of the main body 100, the display 400, and the operation unit 450 correspond to each other, it may be advantageous in design, and structurally efficient arrangement may be achieved. Further, even when the plurality of buttons and the like are not arranged for the plurality of operation modes 900, the user may effectively select one of the plurality of operation modes 900 through the dial-type operation unit 450.

In one example, an outer circumferential surface of the display 400 corresponds to the operation unit 450, so that the user may rotate the outer circumferential surface of the display 400 to select one of the plurality of operation modes 900.

Further, at least the temperature display portion 410 of the display 400 is lit in different colors based on the temperature of the discharge gas to improve the recognition rate of the user. For example, the temperature display portion 410 may be lit or emit the light in the different colors based on the temperature or the temperature section of the discharge gas to provide the current temperature information to the user using only the color.

In one example, in an embodiment of the present disclosure, the lighting portion 180 may emit the light in the same color as the temperature display portion 410. As the lighting portion 180 described above and the temperature display portion 410 are lit or emit the light in the same color, color information provided to the user may be coincided and a convenience may be improved. In one example, the speed display portion, the operation mode display portion 414, or the like of the display 400 may also be lit in different colors based on the temperature together with the temperature display portion 410.

In one example, in an embodiment of the present disclosure, the gas outlet portion 200 may be disposed on the front surface of the main body 100, the heater 120 may be disposed inside the main body 100 to be adjacent to the gas outlet portion 200, and the display 400 may be disposed on the rear surface of the main body 100. Such arrangement relationship between the gas outlet portion 200, the heater 120, and the display 400 may refer to FIG. 2.

In an embodiment of the present disclosure, the gas outlet portion 200 may be disposed on the front surface of the main body 100, and the display 400 may be disposed on the rear surface of the main body 100, so that a separation distance between the heater 120 or the gas outlet portion 200 that may have a high temperature and the display 400 may be increased and a bad influence of the heat of the gas outlet portion 200 and the heater 120 being transferred to the display 400 may be minimized.

In one example, FIG. 12 illustrates an exterior of the handle 500 extending from the main body 100. In an embodiment of the present disclosure, as shown in FIG. 12, a crossing angle C of a longitudinal direction L1 of the main body 100 and a longitudinal direction L2 of the handle 500 may be less than 90 degrees.

That is, when viewed from the front or side, the hair dryer according to an embodiment of the present disclosure may have a shape in which a front end of the main body 100 is inclined downward toward the handle 500.

The crossing angle C formed by the longitudinal direction L1 of the main body 100 and the longitudinal direction L2 of the handle 500 corresponds to an acute angle, but the crossing angle C may be close to 90 degrees. For example, the crossing angle C may be greater than 70 degrees and less than 90 degrees.

As the crossing angle C is set to less than 90 degrees, it may be advantageous for the user to manipulate the hair dryer such that the discharge gas is directed toward a scalp or hair of the user.

For example, it may be advantageous for a user's elbow to be positioned adjacent to or higher than a chest to support a weight of the hair dryer because of a structure of a human body. In this case, as the crossing angle C is set to less than 90 degrees, a rotation angle of a wrist for directing the gas outlet portion 200 toward the user's scalp or hair may be reduced, thereby improving a convenience.

In one example, as described above, in an embodiment of the present disclosure, the gas inlet portion 550 may be disposed on the handle 500, the gas flow path 350 may extend from the interior of the handle 500 to the interior of the main body 100 to communicate the gas inlet portion 550 and the gas outlet portion 200 with each other, and the fan 510 may be disposed inside the handle 500. FIG. 13 illustrates such arrangement structure of the gas inlet portion 550, gas flow path 350, and the fan 510.

Referring to FIG. 13, the fan 510 is disposed on the gas flow path 350 inside the handle 500 to flow the gas. In an embodiment of the present disclosure, as the fan 510 is disposed in the handle 500, the user may reduce a load on the wrist for adjusting the discharge direction of the gas outlet portion 200 in the process of using the hair dryer.

Specifically, the user may adjust the gas discharge direction of the hair dryer by gripping the handle 500 to fix the hair dryer in the hand and adjusting each joint of the wrist or an arm.

In this connection, when the fan 510 is disposed in the handle 500 compared to a case in which the fan 510 is disposed in the main body 100, a center of gravity of the entire hair dryer may become closer to a fixed point of the hair dryer and the load applied on the wrist of the user for adjusting the gas discharge direction may be reduced, thereby improving the convenience in using the hair dryer.

A specific location of the fan 510 in the handle 500 may vary as needed. FIG. 13 is a view in which the gas inlet portion 550 is disposed at an end of the handle 500 according to an embodiment of the present disclosure and the fan 510 is disposed on the gas flow path 350 between the gas inlet portion 550 and the main body 100.

In one example, FIG. 13 illustrates a cross-sectional view in which a filter 600 is inserted into and coupled to the handle 500 according to an embodiment of the present disclosure, and FIG. 14 illustrates a cross-sectional view in which the filter 600 is separated from the handle 500.

Referring to FIGS. 13 and 14, in an embodiment of the present disclosure, the gas inlet portion 550 is disposed on the handle 500, and the filter 600 inserted into the gas inlet portion 550 through an insertion hole 522 defined in a bottom surface 520 of the handle 500 is included.

The handle 500 may have the insertion hole 522 defined in the bottom surface 520 of the extended end thereof into which the filter 600 may be inserted. In FIGS. 13 and 14, the handle 500 extending substantially downward from the main body 100 is illustrated. In addition, it is illustrated that the insertion hole 522 is defined in the bottom surface of the handle 500 as the bottom surface 520.

The filter 600 is inserted and disposed inside the gas inlet portion 550 to filter the gas flowing into the gas flow path 350 through the gas inlet portion 550. Accordingly, a foreign substance present in the gas flowing from the outside may be filtered, and the fan 510 or the like may be prevented from being damaged or destroyed by the foreign substance.

The filter 600 may be composed of a mesh type filtering region in which the foreign substance is filtered as the gas passes and a frame for fixing a member of the filtering region. However, the filtering region may be formed in various types capable of selectively removing the foreign substance from the gas in addition to the mash type, and the frame may be excluded or formed in various shapes. FIG. 15 illustrates the filter 600 including the filtering region and the frame according to an embodiment of the present disclosure.

A shape of the insertion hole 522 may be various, and the filter 600 inserted into the insertion hole 522 may be formed in a shape corresponding to a cross-section shape of the insertion hole 522. For example, the gas inlet portion 550 may be formed in a cylindrical shape surrounding a lower portion of the handle 500, the filter 600 may have a cylindrical shape corresponding to the gas inlet portion 550, and the insertion hole 522 may have a ring shape to correspond to the filter 600. However, the shapes of the gas inlet portion 550, the filter 600, and the insertion hole 522 are not necessarily limited thereto.

In an embodiment of the present disclosure, the insertion hole 522 for inserting the filter 600 therein is defined in the bottom surface 520 of the handle 500, so that a portion to be coupled to the filter 600 does not present on a side surface of the handle 500 where contact with the user's hand is easy. Thus, a situation in which the portion to be coupled to the filter 600 is unnecessarily contacted during the manipulation of the user and the coupling becomes poor may be prevented.

In one example, FIG. 15 illustrates an exterior of the filter 600 removed from the handle 500. Referring to FIGS. 13 to 15, in an embodiment of the present disclosure, the gas inlet portion 550 may be disposed at an end of the side surface of the handle 500 adjacent to the bottom surface 520.

The filter 600 may be inserted through the bottom surface 520 of the handle 500 and disposed to face an inner surface of the gas inlet portion 550 to remove the foreign substance from the introduced gas. Further, in an embodiment of the present disclosure, as the gas inlet portion 550 is disposed at the end of the handle 500, the filter 600 inserted through the bottom surface 520 of the handle 500 is disposed on the inner surface of the gas inlet portion 550, which is advantageous for filtering the gas.

In one example, the handle 500 corresponds to a grip region gripped by the user, so that the gas inlet portion 550 is disposed at a lower end of the handle 500 to minimize a situation in which the user's hand shields the gas inlet portion 550.

In one example, the gas inlet portion 550 disposed on the handle 500 may be formed in various types and schemes. Referring to FIGS. 13 to 15, in an embodiment of the present disclosure, the gas inlet portion 550 extends along a circumference of the side surface of the handle 500 and includes a plurality of inlet holes penetrating an outer wall of the side surface.

Referring to FIG. 15, the gas inlet portion 550 is disposed to extend along a circumference of the handle 500 to surround the side surface of the handle 500, and the plurality of inlet holes is defined, so that the gas may flow toward the gas flow path 350 inside the handle 500.

The gas inlet portion 550 may be set to have a predetermined height from the lower end of the handle 500, and a region defined as the gas inlet portion 550 of the handle 500 may have the plurality of inlet holes. A shape of each inlet hole may be various, such as circular, polygonal, or the like, and a cross-sectional area, an arrangement pattern, or the number of the inlet holes may be various as needed.

In one example, in an embodiment of the present disclosure, the end where the gas inlet portion 550 is formed may be formed separately from the handle 500 and may be coupled to a remaining portion of the handle 500. However, as shown in FIG. 15, the handle 500 may be integrally formed with the gas inlet portion 550 as the plurality of inlet holes are defined in a circumferential surface of the side surface of the handle 500.

Further, the filter 600 may be inserted through the insertion hole 522 and disposed such that an outer circumferential surface thereof faces an inner circumferential surface of the gas inlet portion 550.

Specifically, in an embodiment of the present disclosure, in the handle 500, the region where the gas inlet portion 550 is formed and the remaining region may be integrally formed. For example, as shown in FIG. 15, in the handle 500, a region corresponding to the end of the handle 500 may be formed to have the plurality of inlet holes, so that the gas inlet portion 550 may be formed.

As described above, when the gas inlet portion 550 of the handle 500 is integrally formed, there is no separate coupling portion between the gas inlet portion 550 and the handle 500, so that a situation in which coupling at the coupling portion becomes poor during the manipulation of the user may be prevented.

In one example, the gas inlet portion 550 is disposed to extend along the circumference of the handle 500 to surround the lower end portion of the handle 500. the filter 600 is inserted through the insertion hole 522 of the bottom surface 520 handle. Thus, the filter 600 positioned inside the handle 500 may be disposed such that an outer surface thereof faces an inner surface of the handle 500.

That is, the gas inlet portion 550 is disposed at the end of the handle 500, which may be advantageous for the filter 600 inserted through the insertion hole 522 to be positioned to correspond to the inner surface of the gas inlet portion 550.

In one example, FIG. 15 illustrates the shape of the insertion hole 522 defined in the bottom surface 520 of the handle 500 from which the filter 600 is removed.

Referring to FIG. 15, in an embodiment of the present disclosure, the insertion hole 522 may have a ring shape extending along a rim of the bottom surface 520, and the filter 600 may have a cross-section shape corresponding to the insertion hole 522 and may be formed in a cylindrical shape having a length corresponding to a length of the gas inlet portion 550.

In an embodiment of the present disclosure, a cross-section shape of the handle 500 may be variously determined, and the insertion hole 522 may extend along the rim of the bottom surface 520 of the handle 500 to have the ring shape. In FIG. 15, the handle 500 has a substantially circular cross-section according to an embodiment of the present disclosure, and the insertion hole 522 has an O-shaped ring shape.

In one example, the filter 600 may be formed in a hollow pipe shape, or in a cylindrical shape with open top and bottom and the cross-section of the filter 600 may correspond to the insertion hole 522, so that the filter 600 may be inserted through the insertion hole 522.

Further, in the handle 500, an upper end of the filter 600 may be disposed at a higher position than at least an upper end of the gas inlet portion 550 to completely filter the gas introduced through the gas inlet portion 550. That is, the length of the filter 600 may correspond to the length of the gas inlet portion 550.

In FIG. 13, the gas inlet portion 550 is formed to have the predetermined height from the lower end of the handle 500 according to an embodiment of the present disclosure, and the cylindrical filter 600 having the length corresponding to the length of the gas inlet portion 550 is inserted and disposed inside the gas inlet portion 550 through the insertion hole 522.

In one example, as shown in FIGS. 13 and 14, in an embodiment of the present disclosure, a wire 580 electrically connected to the fan 510 may pass through a center of the filter 600 and be withdrawn out of the handle 500.

In an embodiment of the present disclosure, power needs to be supplied to a plurality of components including the fan 510 inside the hair dryer. In addition, the fan 510 and the like may be supplied with the power through the wire 580 from the outside.

In one example, in an embodiment of the present disclosure, the filter 600 is inserted through the bottom surface 520, the filter 600 has the cylindrical shape, which has a space therein, and the wire 580 extends in the internal space of the filter 600 to be withdrawn out of the handle 500, so that efficient design and arrangement of the components are achieved.

In an embodiment of the present disclosure, the filter 600 has an incision 630 extending along the longitudinal direction. Both sides of the incision 630 may be coupled to and separated from each other.

The incision 630 of the filter 600 has a structure in which both sides thereof are separated from each other. FIG. 15 illustrates the incision 630 extending along the longitudinal direction of the filter 600 and illustrates that both sides of the incision 630 are separated from each other.

Both sides of the incision 630 may be provided to be coupled to each other and separated from each other by a magnet or a hook. FIG. 15 illustrates that magnets extending in the longitudinal direction of the filter 600 are respectively arranged at both sides of the incision 630 according to an embodiment of the present disclosure, and both sides of the incision 630 are formed to be coupled to each other or separated from each other by the magnets.

The filter 600 may be cut by the incision 630 such that the internal space is exposed. Accordingly, in a situation in which the wire 58 is extended along the hollow region of the filter 600, the filter 600 may be cut such that both sides of the incision 630 are separated from each other, thereby moving the wire 580 out of the hollow region.

FIG. 15 illustrates that the filter 600 is cut such that both sides of the incision 630 are separated from each other in order for the filter 600 to be easily deviated from the wire 580 in a situation in which the wire 580 is disposed in the hollow region of the filter 600 according to an embodiment of the present disclosure.

As described above, the cylindrical filter 600 with the incision 630 defined therein may be easily removed from the handle 500 by the user in a situation in which replacement is required. A wire outlet 525 may have the same longitudinal direction as the handle 500 and may be positioned such that the bottom surface 520 thereof corresponds to the bottom surface 520 of the handle 500.

In one example, FIGS. 13 and 14 illustrate the wire outlet 525 disposed at a center of the bottom surface 520 of the handle 500, and FIG. 16 illustrates a view of the wire outlet 525 viewed from the outside.

Referring to FIG. 16, an embodiment of the present disclosure may further include the wire outlet 525 disposed at a center of the insertion hole 522 and through which the wire 580 penetrates.

That is, in an embodiment of the present disclosure, the insertion hole 522 is defined in the bottom surface 520 of the handle 500 and the wire outlet 525 is disposed at the center of the insertion hole 522, so that a structure in which the wire 580 extends through the hollow of the filter 600 and is withdrawn to the outside is achieved.

Referring to FIG. 15, in an embodiment of the present disclosure, the wire outlet 525 and the outer wall of the handle 500 may be spaced apart from each other at the lower portion of the handle 500 to define the insertion hole 522.

In one example, as shown in FIG. 16, the wire outlet 525 may be made of an elastic material and may have a curved portion 526 that is indented inward of the handle 500 toward the wire 580.

The curved portion 526 may constitute an entirety or a portion of the bottom surface 520 of the wire outlet 525. An entirety of the bottom surface 520 or at least the curved portion 526 of the wire outlet 525 may be made of a material having high elasticity, such as rubber, urethane, or the like.

In one example, the curved portion 526 may have a curved surface that is indented inward of the handle 500 toward the wire 580, based on a radial direction of the bottom surface 520 of the wire outlet 525. In this case, when the wire 580 withdrawn from the wire outlet 525 is curved or bent in the process of the use of the user, a curvature thereof at a contact point with the wire outlet 525 may be reduced, which may be advantageous to suppress breakage of the wire 580.

Further, the curved portion 526 is made of the high-elasticity material such as the rubber, the urethane, or the like. Thus, when a tension acts on the wire 580, elastic deformation occurs on the curved portion 526 corresponding to the tension or the bending of the wire 580, which may effectively suppress a situation in which breakage or damage occurs as a stress is concentrated at a point on the wire 580 where the bending occurs.

FIG. 16 schematically illustrates a state in which an angle between a direction in which the wire 580 is withdrawn and the longitudinal direction of the handle 500 changes from 0 to 90 degrees. In FIG. 16, an embodiment of the present disclosure may prevent the wire 580 from breaking or damaging through the curved surface formed by the curved portion 526 and the elastic deformation.

Referring again to FIGS. 13 and 14, in an embodiment of the present disclosure, in the filter 600, one end 610 thereof inserted into the handle 500 may be detachably coupled to the inner surface of the handle 500 and the other end 620 thereof may shield the insertion hole 522 and surround the wire outlet 525.

One end 610, which is an upper end based on FIG. 13, of the filter 600 inserted into the insertion hole 522 through the insertion hole 522 is detachably coupled to the inner surface of the handle 500. A coupling scheme may be various, such as screw coupling, coupling using a magnet, hook coupling, and the like.

FIG. 13 illustrates that one end 610 of the filter 600, that is, the upper end of the filter 600 is coupled to one side of the inner surface of the handle 500. FIG. 14 illustrates that one end 610 of the filter 600 is separated from one side of the inner surface of the handle 500.

In one example, in the filter 600 having one end 610 is coupled to the inner surface of the handle 500, the other end 620 may be positioned at the insertion hole 522 side to shield the insertion hole 522. Further, the other end 620 of the filter 600 disposed to shield the insertion hole 522 may be positioned to surround the wire outlet 525 disposed at the center.

That is, as shown in FIG. 13 or 16, in the filter 600 disposed inside the handle 500, the other end 620 may be exposed out of the handle 500 while shielding the insertion hole 522 and may form the bottom surface 520 of the handle 500 together with the wire outlet 525.

In one example, as shown in FIG. 13, the handle 500 may further include a stopper 505 protruding from the inner surface of the handle 500 and facing one end 610 of the filter 600. One end 610 of the filter 600 may be coupled to the stopper 505.

Referring to FIG. 13, the stopper 505 may protrude from the inner surface of the handle 500 toward the center of the cross-section based on the radial direction of the handle 500. The stopper 505 may be provided on the inner surface of the handle 500 as one protrusion, may be provided as a plurality of protrusions, or may have a ring shape extending in a circumferential direction of the handle 500.

The stopper 505 protruding from the inner surface of the handle 500 faces one end 610 of the filter 600 based on the longitudinal direction of the handle 500 or the insertion direction of the filter 600. The stopper 505 may limit one end 610 of the filter 600 from being moved upward of the handle 500, and may form a coupling relationship with the one end 610 of the filter 600 in contact.

FIG. 13 illustrates that magnets are respectively arranged at the stopper 505 and one end 610 of the filter 600, and the stopper 505 and one end 610 of the filter 600 are coupled with each other by a magnetic force. However, the magnet may be disposed at one of the stopper 505 and one end 610 of the filter 600 and the other may contain a metal material to which attraction of the magnet may act.

In one example, in an embodiment of the present disclosure, the filter 600 may further include a flange 625 that extends along a circumference of the other end 620 and protrudes in the radial direction of the filter 600, so that an outer circumferential surface thereof is exposed to the outside.

The other end 620 of the filter 600 may further include the flange 625 that is disposed at the insertion hole 522 side and protrudes in the radial direction. The outer circumferential surface of the flange 625 is exposed to the outside, and FIG. 16 illustrates that the outer circumferential surface of the flange 625 is disposed to form the same face as the outer surface of the handle 500.

In an embodiment of the present disclosure, the other end 620 of the filter 600 further includes the flange 625, so that a step may be prevented from being formed at a boundary between the bottom surface 520 and the outer surface of the handle 500 in a state in which the filter 600 is coupled to the handle 500 and a grip region for removing the filter 600 may be provided to the user, thereby improving the usability.

In one example, in an embodiment of the present disclosure, as shown in FIG. 17, the main body 100 and the handle 500 respectively include protection members 130 respectively protruding from the outer surfaces thereof. The protection member 130 of the body 100 and the protection member 130 of the handle 500 may be positioned to be in contact with a same virtual plane together.

Considering an overall shape of the hair dryer in which the handle 500 extends downward from the main body 100, the hair dryer may be stored such that the side surface thereof is in contact with the ground and the like in the process of use. A damage such as a scratch may occur on an outer wall of the hair dryer for reasons such as when the hair dryer is moved from a state of being in contact with the ground and the like.

Accordingly, in an embodiment of the present disclosure, the protection members 130 may be respectively arranged on the side surfaces of the main body 100 and the handle 500, so that the damage of the outer wall resulted from the contact with the ground and the like may be suppressed.

The protection members 130 may be respectively arranged on the main body 100 and the handle 500, and the protection members 130 may be respectively arranged on the side surfaces of the main body 100 and the handle 500 based on the front portion where the gas outlet portion 200 may be disposed and the rear portion where the display 400 may be disposed.

The protection members 130 may be arranged to protrude from the outer walls of the main body 100 and the handle 500. Accordingly, even when the main body 100 and the handle 500 respectively provided with the protection members 130 are stored such that the side surfaces thereof face the ground, at least a portion of the outer walls of the main body 100 and the handle 500 may be maintained in a state of being spaced apart from the ground.

The protection member 130 may be made of various materials and may be made of an elastic material such as rubber and the like.

In one example, the protection members 130 respectively arranged on the main body 100 and the handle 500 may be arranged to simultaneously be in contact with the same plane. FIG. 17 schematically illustrates a state in which the protection members 130 respectively arranged on the main body 100 and the handle 500 are brought into contact with that ground, which is presented as the same plane, together.

In one example, the hair dryer according to an embodiment of the present disclosure may further include auxiliary means coupled to the main body 100.

FIG. 18 illustrates a state in which a concentrator 800 is coupled to the main body 100 as the auxiliary means according to an embodiment of the present disclosure, FIG. 19 illustrates a perspective view of the concentrator 800, and FIG. 20 illustrates a view of the concentrator 800 view from the rear.

Referring to FIG. 18, an embodiment of the present disclosure may further include the concentrator 800 that is coupled to the main body 100 to cover the gas outlet portion 200, receives the gas discharged from the gas outlet portion 200, and discharges the gas to the outside.

Further, FIG. 21 is a cross-sectional view schematically illustrating an interior of the concentrator 800. Referring to FIG. 21, the concentrator 800 may include a first flow path 872 along which the gas discharged from the center hole 230 flows and a second flow path 874 that is divided from the first flow path 872 and along which the gas discharged from the side hole 250 flows.

The concentrator 800 illustrated in FIGS. 18 and 20 may be used to reduce the cross-sectional area of the discharge gas discharged from the main body 100 and provide the discharge to the user at a higher flow rate.

FIG. 19 illustrates a discharge hole 830 through which the gas is discharged from the concentrator 800, and FIG. 20 illustrates a rear surface of the concentrator 800 coupled to the main body 100. The discharge hole 830 in FIG. 19 and the rear surface in FIG. 20 may be located at opposite sides of the concentrator 800. For example, the rear surface of the concentrator 800 illustrated in FIG. 20 faces the main body 100, and the discharge hole 830 in FIG. 19 may be defined at the opposite side of the rear surface of the concentrator 800.

In one example, the first flow path 872 along which the discharge gas of the center hole 230 of the gas outlet portion 200 disposed on the main body 100 flows and the second flow path 874 along which the discharge gas of the side hole 250 of the gas outlet portion 200 flows are defined inside the concentrator 800. The first flow path 872 and the second flow path 874 are divided from each other, so that gas flow between the first flow path 872 and the second flow path 874 may be limited.

In the concentrator 800 into which the discharge gas of the center hole 230 and the discharge gas of the side hole 250 simultaneously flow, the discharge gas of the center hole 230 and the discharge gas of the side hole 250 are mixed with each other to form turbulence, which may cause noise or gas speed loss Accordingly, an embodiment of the present disclosure includes the first flow path 872 and the second flow path 874 along which the discharge gas of the center hole 230 and the discharge gas of the side hole 250 respectively flow in a separated manner in the concentrator 800, so that flow of each discharge gas may be smoothly maintained.

FIG. 21 illustrates that the first flow path 872 in communication with the center hole 230 and the second flow path 874 in communication with the side hole 250 are defined inside the concentrator 800.

In one example, referring to FIG. 21, the concentrator 800 according to an embodiment of the present disclosure may further include a third flow path 876 that is in communication with the first flow path 872 and the second flow path 874 and has the discharge hole 830 through which a mixture of the gas in the first flow path 872 and the gas in the second flow path 874 is discharged to the outside.

The third flow path 876 is connected to ends of the first flow path 872 and the second flow path 874 and corresponds to a flow path at which the first flow path 872 and the second flow path 874 are integrated. The discharge gas of the center hole 230 and the discharge gas of the side hole 250 respectively flowed along the first flow path 872 and the second flow path 874 are mixed with each other while minimizing a flow resistance and flow together in the third flow path 876.

For example, the first, the second, and the third flow path may have a Y-shaped connection relationship as shown in FIG. 21. However, the connection structure of the first, the second, and the third flow paths is not necessarily limited to the Y shape.

The discharge gas of the center hole 230 and the discharge gas of the side hole 250, which are mixed with each other and flow in the third flow path 876, are discharged through the discharge hole 830 defined at an end of the third flow path 876 and delivered to the user. FIG. 19 illustrates the discharge hole 830 defined at the end of the third flow path 876 according to an embodiment of the present disclosure.

In one example, the concentrator 800 according to an embodiment of the present disclosure may further include a nozzle 810 having one end facing the main body 100 coupled to the main body 100 and having a diameter, which is reduced as being farther away from the main body 100, and a discharge portion 820 extending from the other end of the nozzle 810 and in which the discharge hole 830 is defined.

FIG. 21 illustrates the nozzle 810 having the diameter, which is reduced as being farther away from the main body 100, and the discharge portion 820 having the discharge hole 830 defined therein. One end of the nozzle 810 facing the main body 100 may be coupled to the main body 100, and one end of the nozzle 810 facing the main body 100 may correspond to the rear surface of the concentrator 800 illustrated in FIG. 20.

A flow speed of the gas flowing inside the concentrator 800 may increase while passing through the nozzle 810, and the gas that has passed the nozzle 810 may flow inside the discharge portion 820 and then be discharged through the discharge hole 830.

In one example, referring to FIG. 21, in an embodiment of the present disclosure, the first flow path 872 and the second flow path 874 are defined inside the nozzle 810, and the third flow path 876 may be defined inside the discharge portion 820.

Therefore, at least portions of the discharge gas of the center hole 230 and the discharge gas of the side hole 250, which are separated from each other by the first and second flow paths inside the concentrator 800, may increase in the flow speed while passing through the nozzle 810 and may be mixed with each other in the third flow path 876 of the discharge portion 820 after exiting the nozzle 810 and then discharged to the user.

In one example, in an embodiment of the present disclosure, the concentrator 800 may further include an outer case 850 constituting outer surfaces of the nozzle 810, and a flow path forming portion 860 that is disposed in an internal space of the nozzle 810, has a shape corresponding to the nozzle 810, has an outer surface spaced from an inner surface of the outer case 850, and has an open end 880 facing the discharge portion 820.

Further, the first flow path 872 may correspond to an internal space of the flow path forming portion 860, and the second flow path 874 may correspond to a separation space between the flow path forming portion 860 and the outer case 850.

FIG. 21 illustrates the outer case 850 constituting an outer surface of the concentrator 800 and the flow path forming portion 860 disposed inside the outer case 850 to divide the first and second flow paths from each other.

The outer case 850 has a diameter reduced at the nozzle 810 and includes the discharge portion 820 extending from the nozzle 810, and the nozzle 810 and the discharge portion 820 may be integrally molded.

The flow path forming portion 860 has a diameter reduced as being farther away from the gas outlet portion 200 like the outer case 850 on the nozzle 810, so that the flow path forming portion 860 may have a shape corresponding to a shape of the outer case 850.

An outer surface of the flow path forming portion 860 may be spaced apart from the inner surface of the outer case 850 to define the second flow path 874. Further, the internal space of the flow path forming portion 860 may correspond to the first flow path 872. Accordingly, an outer space of the flow path forming portion 860 may correspond to the second flow path 874, the internal space thereof may correspond to the first flow path 872, and the first and second flow paths may be divided from each other by the flow path forming portion 860.

In the flow path forming portion 860, the first flow path 872 may decrease in diameter toward a downstream based on the gas flow, thereby increasing the flow speed of the gas. Further, when necessary, the second flow path 874 may increase the flow speed of the gas by reducing a separation distance between the outer case 850 and the flow path forming portion 860 toward a downstream.

In one example, in the flow path forming portion 860, the end 880 facing the discharge portion 820 may be opened, so that the first flow path 872 inside the flow path forming portion 860 may be in communication with the third flow path 876. In this connection, the second flow path 874 may also be in communication with the third flow path 876 because of the opening of the end 880 of the flow path forming portion 860 facing the discharge portion 820. That is, because of the opening of the end 880 of the flow path forming portion 860 facing the discharge portion 820, the division between the first and second flow paths disappears and the gases in the first and second flow paths are mixed with each other and flow along the third flow path 876.

In one example, in an embodiment of the present disclosure, an end of the outer case 850 of the concentrator 800 facing the gas outlet portion 200 may be coupled to the outer wall of the main body 100, and an end of the flow path forming portion 860 facing the gas outlet portion 200 may be in close contact with a rim of the base 210 to divide the first flow path 872 and the second flow path 874 from each other.

FIG. 22 is a cross-sectional view in which the concentrator 800 and the main body 100 of the hair dryer are coupled to each other. Referring to FIG. 22, the end of the flow path forming portion 860 facing the gas outlet portion 200 may be in close contact with or adhered to the rim of the base 210.

That is, in an embodiment of the present disclosure, the rim of the base 210 may correspond to an inner circumferential surface of the side hole 250, and the flow path forming portion 860 may be in close contact with the inner circumferential surface of the side hole 250 to block the discharge gas of the side hole 250 from flowing toward the first flow path 872 of the flow path forming portion 860.

In one example, as shown in FIG. 22, the end of the outer case 850 of the concentrator 800 facing the gas outlet portion 200 may be coupled to the outer wall of the main body 100. Accordingly, an outer circumferential surface of the side hole 250 may be in contact with the outer case 850 or be located at least in a space between the outer case 850 and the flow path forming portion 860.

Therefore, the discharge gas of the side hole 250 may flow through the interior of the second flow path 874 of the concentrator 800 without leaking to the outside.

FIG. 22 illustrates that, as the end of the flow path forming portion 860 facing the gas outlet portion 200 is in close contact with an inner wall of the side hole 250, that is, the rim of the base 210, the discharge gas of the center hole 230 flows through the first flow path 872 inside the flow path forming portion 860 and the discharge gas of the side hole 250 flows through the second flow path 874 between the flow path forming portion 860 and the outer case 850. Further, FIG. 22 schematically illustrates that the gas flows in the first and second flow paths are mixed with each other by the opening of the end 880 of the flow path forming portion 860 facing the discharge portion 820 and the mixture flows along the third flow path 876 and is discharged through the discharge hole 830.

In an embodiment of the present disclosure, the outer case 850 may include a heat insulating layer 855 between an outer surface and an inner surface thereof. FIG. 21 illustrates the heat insulating layer 855 included between the outer surface and the inner surface of the outer case 850.

As the heat insulating layer 855 is formed inside the outer case 850, the concentrator 800 may suppress a situation in which the heat of the discharge gas is transmitted to the outside or the temperature of the discharge gas is affected by a temperature of the outdoor air.

Referring again to FIG. 19, in an embodiment of the present disclosure, the discharge portion 820 may have an elliptical cross-section and may have the discharge hole 830 through which the gas is discharged defined at an end opposite to the main body 100.

As the third flow path 876 has an elliptical shape, the gas discharged through the third flow path 876 may have a cross-sectional length while minimizing the turbulence. Accordingly, the user may receive the gas having the cross-sectional length, and the user may effectively utilize the gas having the cross-sectional length for each portion of the scalp or the hair where drying or styling is required.

In one example, based on a long axis X and a short axis Y of the elliptical shape of the cross section of the discharge portion 820, FIG. 23 illustrates the discharge portion 820 viewed in the long axis X direction, and FIG. 24 illustrates the discharge portion 820 viewed in the short axis Y direction.

As shown in FIGS. 23 and 24, in an embodiment of the present disclosure, in the discharge portion 820, a length of the long axis X of the elliptical shape formed by the cross-section may be constant or increased and a length of the short axis Y may be constant or decreased toward the discharge hole 830.

As shown in FIG. 24, the length of the long axis X of the elliptical shape of the cross-section may increase toward the discharge hole 830 along the longitudinal direction, so that the discharge portion 820 may secure the length of the gas discharged.

Further, as shown in FIG. 23, the length of the short axis Y of the elliptical shape of the cross-section may decrease toward the discharge hole 830 along the longitudinal direction, and thus, the discharge portion 820 may prevent a decrease in the flow speed of the gas resulted from the increase in the length of the long axis X or may additionally increase the flow speed.

However, change amounts of the length of the long axis X and the length of the short axis Y and the like of the elliptical shape of the cross-section of the discharge portion 820 may be variously determined as necessary.

In one example, in an embodiment of the present disclosure, when the discharge portion 820 is viewed in the direction of the short axis Y of the elliptical shape, a central side of the discharge hole 830 may be indented toward the main body 100.

FIG. 24 illustrates a state in which a central side of the end of the discharge portion 820 where the discharge hole 830 is defined is indented toward an opposite side when viewed from the direction of the short axis Y of the elliptical shape.

The discharge hole 830 becomes closer to the scalp or the hair of the user. Accordingly, the central side of the discharge hole 830 is defined in a curved manner to be indented toward the main body 100, so that the discharge hole 830 is able to have a shape similar to a portion where the gas is provided, such as the scalp of the user, forming a curved surface, thereby improving the hair dryer usability of the user.

In one example, FIG. 25 illustrates the plurality of operation modes 900 preset in the controller 700 according to an embodiment of the present disclosure. The controller 700 may determine the current operation mode through the operation unit 450 manipulated by the user.

In an embodiment of the present disclosure, the plurality of operation modes 900 may include a manual mode 910, the automatic mode 920, and a custom mode 930.

First, in the manual mode 910, the temperature and the speed of the discharge gas may be adjusted by the user. Specifically, the operation unit 450 may include a temperature adjustor and a speed adjustor, and the controller 700 may receive set values of the temperature adjustor and the speed adjustor manipulated by the user to control driving states of the heater 120 and the fan 510.

In this connection, the temperature adjustor may be manipulated with a plurality of temperature values preset in the controller 700. For example, first, second, third, and fourth temperatures may be preset in the controller 700 like 28° C., 40° C., 60° C., 90° C., and the like in the controller 700, and the temperature adjustor may be disposed to be manipulated with selected one of the first, the second, the third, and the fourth temperatures.

However, a scheme of adjusting the temperature of the discharge gas may not be necessarily limited thereto, and the number of preset temperature values or the temperature values thereof may vary. Alternatively, there may be no preset temperature values and the temperature adjustor may be disposed to set the temperature of the discharge gas based on a standard unit such as 1° C.

In one example, the speed adjustor may also be manipulated with a plurality of preset speed values, or may be disposed to adjust the speed of the discharge gas based on a standard unit without the preset speed values.

In one example, in the automatic mode 920, the plurality of individual modes 950 may be sequentially executed. In this connection, at least one of the temperature and the speed of the discharge gas may vary based on the plurality of individual modes 950. The number of individual modes 950 may be variously set, and settings of the individual modes 950 are different from each other.

For example, the plurality of individual modes 950 may include a scalp drying mode 951, a hair drying mode 953, a styling mode 955, a cooling mode 957, and the like. The at least one of the temperature and the speed of the discharge gas may vary based on the individual modes 950. In the automatic mode 920, the plurality of individual modes 950 are sequentially executed by the controller 700, and switching between the individual modes 950 may be automatically executed by the controller 700.

In one example, FIG. 26 illustrates the plurality of individual modes 950 that may be executed in the automatic mode 920 according to an embodiment of the present disclosure. The plurality of individual modes 950 will be described in detail with reference to FIG. 26.

First, the plurality of individual modes 950 included in the automatic mode 920 may include the scalp drying mode 951, the hair drying mode 953, the styling mode 955, and the cooling mode 957, and may further include a repetition mode that is executed after the cooling mode 957.

The plurality of individual modes 950 are set through statistic identification of needs of the user, consult with a hair management expert, and the like.

When the automatic mode 920 according to an embodiment of the present disclosure is executed, the user may remove moisture present in the scalp through the scalp drying mode 951. To this end, a temperature of the discharge gas preset in the scalp drying mode 951 may be set to the first temperature. The first temperature may be set to a medium-low temperature, for example, 40° C., thereby not causing discomfort such as pain of the scalp.

Further, the speed of the discharge gas may be set to a first speed. The first speed may be set, for example, to a high speed to facilitate the moisture removal.

In one example, the user may remove moisture present in the hair through the hair drying mode 953 executed after the scalp drying mode 951.

Compared to the scalp, the hair is relatively less likely to cause the pain or the discomfort of the user by the discharge gas temperature. In addition, more moisture may be present in the hair. Thus, a discharge gas temperature of the hair drying mode 953 may be set, for example, to a medium-high temperature such as 60° C. and the like. In addition, the discharge gas temperature of the hair drying mode 953 may be the second temperature higher than the temperature of the scalp drying mode 951.

Further, the discharge gas speed may be maintained at the high speed as in the scalp drying mode 951 such that the removal of the moisture in the hair drying mode 953 may be efficient. For example, a discharge gas speed of the hair drying mode 953 may be set to the first speed as in the scalp drying mode 951.

In one example, the controller 700 may execute the styling mode 955 after the hair drying mode 953, and the user may perform the styling of the hair, such as hair contouring, curling, and the like through the styling mode 955 to suit the needs thereof.

In the styling mode 955, the discharge gas temperature may be set, for example, to a high temperature, such as 90° C. or 100° C., such that a shape of the hair may be fixed as desired by the user. That is, in an embodiment of the present disclosure, a discharge gas temperature of the styling mode 955 may be a third temperature higher than the second temperature of the hair drying mode 953.

Further, in the styling mode 955, the discharge gas speed may be set to a medium or low speed to prevent the hair from losing the required shape by the gas flow and adversely affecting the hair styling. For example, in the styling mode 955, the discharge gas speed may be set to a second speed lower than the first speed of the hair drying mode 953.

In one example, after the styling mode 955, the cooling mode 957 is executed, and the user may lower a temperature of the heated hair through the cooling mode 957.

In the cooling mode 957, the discharge gas temperature may be set, for example, to a low temperature, such as 28° C. and the like to cool the heated hair. That is, a discharge gas temperature of the cooling mode 957 may be a fourth temperature lower than the first temperature, which is the discharge gas temperature of the scalp drying mode 951. The fourth temperature may be lower than the first, the second, and the third temperatures.

Further, because the shape of the hair is organized in the styling mode 955, the cooling mode 957 may be set at a medium-low speed such that the hair does not lose the already organized shape by the gas flow. That is, a discharge gas speed of the cooling mode 957 may be a third speed that is equal to or lower than the second speed, which is the discharge gas speed of the styling mode 955.

In one example, in an embodiment of the present disclosure, the automatic mode 920 may execute the repetition mode after the cooling mode 957. The repetition mode may be a mode in which the styling mode 955 and the cooling mode 957 are repeatedly executed until termination of the automatic mode 920. The termination of the automatic mode 920 may be performed when the user manipulates the operation unit 450 or when termination criteria preset in the controller 700 are satisfied.

The user may not be able to organize the hair in the desired shape through one styling mode 955. Accordingly, an embodiment of the present disclosure provides the repetition mode, so that the user may perform the styling and the cooling of the hair several times.

According to an embodiment of the present disclosure, a relationship between the temperature and the speed of the discharge gas for each of the plurality of individual modes 950 executed in the automatic mode 920 is as follows.

In the scalp drying mode 951, the heater 120 may adjust the temperature of the discharge gas to the first temperature and the fan 510 may adjust the speed of the discharge gas to the first speed.

In the hair drying mode 953, the heater 120 may adjust the temperature of the discharge gas to the second temperature higher than the first temperature and the fan 510 may adjust the speed of the discharge gas to the first speed.

In the styling mode 955, the heater 120 may adjust the temperature of the discharge gas to the third temperature higher than the second temperature and the fan 510 may adjust the speed of the discharge gas to the second speed lower than the first speed.

In the cooling mode 957, the heater 120 may adjust the temperature of the discharge gas to the fourth temperature lower than the first temperature and the fan 510 may adjust the speed of the discharge gas to the third speed equal to or lower than the second speed.

In the repetition mode, the styling mode 955 and the cooling mode 957 may be alternately executed.

However, the automatic mode 920 of the present disclosure is not necessarily limited to the individual modes 950 described above. For example, some of the scalp drying mode 951, the hair drying mode 953, the styling mode 955, and the cooling mode 957 may be omitted, and the relationship between the temperature and the speed of the discharge gas may be modified.

Further, the individual mode 950 may be added for management of the user's hair. The switching between the individual modes 950 may be automatically performed when the switching criteria preset in the controller 700 are satisfied, or the user may manipulate the operation unit 450 to command the switching of the individual mode 950.

As a result, in an embodiment of the present disclosure, the user may conveniently use the hair dryer because the plurality of individual modes 950 may be continuously executed automatically through the automatic mode 920 even when the user does not directly adjust the temperature or the speed of the discharge gas based on each situation.

In one example, as shown in FIG. 25, in an embodiment of the present disclosure, the plurality of operation modes 900 that may be preset in the controller 700 may include the custom mode 930. In the custom mode 930, the user may select one of the plurality of individual modes 950 and continuously execute the same.

The custom mode 930 may be an operation mode in which the user directly selects one of the plurality of individual modes 950 preset in the controller 700 for the automatic mode 920 to use the hair dryer.

For example, in the case of the automatic mode 920, the plurality of individual modes 950 are sequentially executed based on a set condition. The user may want to continuously use one of the plurality of individual modes 950. In this case, the custom mode 930 may be used.

The operation unit 450 may have a separate button or a dial-type selection structure for selecting one of the plurality of individual modes 950 for the custom mode 930.

In an embodiment of the present disclosure, through the custom mode 930 among the plurality of operation modes 900, the user may select one of the plurality of individual modes 950 belonging to the automatic mode 920, and the controller 700 may adjust the temperature and the speed of the discharge gas with a set value of the individual mode 950 selected by the user in the custom mode 930.

In an embodiment of the present disclosure, in the custom mode 930, at least one of the temperature and the speed of the discharge gas preset in the individual mode 950 selected by the user may be changed by the user.

For example, the temperature and the speed of the discharge gas may be preset in the individual mode 950 selected in the custom mode 930. The user may use the temperature and the speed of the discharge gas preset in the selected individual mode 950 or may adjust the at least one of the temperature and the speed of the discharge gas set in the corresponding individual mode 950 based on intention thereof when necessary.

In one example, all or some of the plurality of individual modes 950 may be continuously executed in the custom mode 930 in a state in which some of the plurality of individual modes 950 executed in the automatic mode 920 are selected by the user and stored values of the temperatures and the speeds of the discharge gas of the selected individual modes 950 are changed by the user.

In the processes in which the plurality of operation modes 900 and the plurality of individual modes 950 are executed, the above-described lighting portion 180 or a portion of the display may change in the color based on the temperature of the discharge gas, and the light amount of the lighting portion 180 may be different based on the speed of the discharge gas.

In one example, FIG. 26 illustrates the plurality of individual modes 950 included in the automatic mode 920 among the plurality of operation modes 900 according to an embodiment of the present disclosure. Further, FIG. 27 is a flowchart illustrating a method for controlling the hair dryer according to the automatic mode 920.

Referring to FIGS. 26 and 27, the method for controlling the hair dryer according to an embodiment of the present disclosure may include an automatic mode selection operation S100 of selecting the automatic mode 920 including the plurality of individual modes 950 among the plurality of operation modes 900 by manipulating the operation unit 450, and an automatic mode execution operation S200 of sequentially executing the plurality of individual modes 950.

In the automatic mode selection operation S100, the user may select the automatic mode 920 among the plurality of operation modes 900 by manipulating the operation unit 450. The operation unit 450 may have a single portion or a plurality of portions on the main body 100 or the handle 500, may be formed in the form of the dial as described above, and formed in the shape surrounding the display 400.

When the user selects the automatic mode 920 through the operation unit 450 in the automatic mode selection operation S100, an automatic mode execution signal may be input to the controller 700 and the controller 700 may execute the automatic mode 920.

In the automatic mode execution operation S200, the controller 700 may sequentially execute the plurality of individual modes 950 described above. FIG. 26 illustrates the plurality of individual modes 950 according to an embodiment of the present disclosure, but the present disclosure is not limited thereto. The number, the type, and the set values of the individual modes 950 may be variously changed as necessary.

An embodiment of the present disclosure provides the automatic mode 920 to the user, so that the plurality of individual modes 950 are sequentially provided even when the user does not directly manipulate and execute the plurality of individual modes. In this connection, at least one of the temperature and the speed of the discharge gas may vary based on the plurality of individual modes. Thus, the ease of use of the hair dryer may be greatly improved.

In the automatic mode execution operation S200, the heater 120 and the fan 510 may respectively adjust the temperature and the speed of the discharge gas based on the settings of the plurality of individual modes 950, and the control of the heater 120 and the fan 510 may be performed by the controller 700.

In one example, as shown in FIGS. 26 and 27, in the method for controlling the hair dryer according to an embodiment of the present disclosure, the plurality of individual modes 950 may include the scalp drying mode 951 and the hair drying mode 953. In addition, the automatic mode execution operation S200 may include a scalp drying process S210 and a hair drying process S220.

Specifically, in the scalp drying process S210, the scalp drying mode 951 may be executed, and the controller 700 may control such that the heater 120 adjusts the temperature of the discharge gas to the first temperature and the fan 510 adjusts the speed of the discharge gas to the first speed based on the scalp drying mode 951.

In the hair drying process S220, after the scalp drying process S210, the controller 700 may control such that the heater 120 adjusts the temperature of the discharge gas to the second temperature higher than the first temperature and the fan 510 adjusts the speed of the discharge gas to the first speed based on the hair drying mode 953.

In one example, in an embodiment of the present disclosure, the plurality of individual modes 950 may further include the styling mode 955, and the automatic mode execution operation S200 may further include a styling process S230.

In the styling process S230, after the hair drying process S220, the controller 700 may control such that the heater 120 adjusts the temperature of the discharge gas to the third temperature higher than the second temperature and the fan 510 adjusts the speed of the discharge gas to the second speed lower than the first speed based on the styling mode 955.

In one example, in an embodiment of the present disclosure, the plurality of individual modes 950 may further include the cooling mode 957, and the automatic mode execution operation S200 may further include a cooling process S240.

In the cooling process S240, after the styling process S230, the controller 700 may control such that the heater 120 adjusts the temperature of the discharge gas to the fourth temperature lower than the first temperature and the fan 510 adjusts the speed of the discharge gas to the third speed lower than the second speed based on the cooling mode 957.

In one example, in an embodiment of the present disclosure, the plurality of individual modes 950 may further include the repetition mode, and the automatic mode execution operation S200 may further include a repetition process S250.

In the repetition process S250, after the cooling process S240, the controller 700 may repeatedly execute the styling mode 955 and the cooling mode 957 based on the repetition mode.

In one example, in an embodiment of the present disclosure, in the automatic mode execution operation S200, the user may manipulate the operation unit 450 to switch the individual mode 950, but a reference condition for switching from a currently executed individual mode 950 to a next individual mode 950 may be preset in the controller 700.

The individual mode 950 may have different reference conditions for the switching of the individual mode 950 or all of the individual modes 950 have the same reference condition for the switching of the individual mode 950.

The reference condition may be variously set. For example, when an execution time of the currently executed individual mode 950 is equal to or greater than a reference time preset in the corresponding individual mode 950, the controller 700 may be preset to execute the next individual mode 950.

In this connection, the reference time may correspond to the reference condition for the switching of the individual mode 950, and the reference time may be set differently or identically for the individual modes 950.

In one example, as described above, in an embodiment of the present disclosure, in the automatic mode execution operation S200, when the user manipulates the operation unit 450 to select the switching of the individual mode 950, the currently executed individual mode 950 may be terminated and the next individual mode 950 may be executed.

In one example, in an embodiment of the present disclosure, in the automatic mode execution operation S200, the lighting portion 180 may emit the light in different colors in the plurality of individual modes 950.

For example, the plurality of individual modes 950 may be set to have different discharge gas temperatures. Accordingly, the lighting portion 180 emitting the light in different colors based on temperature conditions may emit the light in the different colors in the plurality of individual modes 950.

Alternatively, the controller 700 may adjust the color of the light emitted from the lighting portion 180 for each individual mode 950 regardless of the temperature of the discharge gas.

As a result, in an embodiment of the present disclosure, the colors of the lighting portion 180 are different in the plurality of individual modes 950 in the automatic mode 920, so that the user may easily identify information of the individual mode 950 currently in progress.

In one example, as described above, an embodiment of the present disclosure may further include the display 400 disposed on the main body 100 and displaying the current operation state of the hair dryer. In the automatic mode execution operation S200, the display 400 may display the currently executed individual mode 950 and at least one of the temperature and the speed of the discharge gas.

Further, at least a portion, for example, the temperature display portion 410 of the display 400 may emit the light in the same color as the lighting portion 180. The temperatures of the discharge gas of the individual modes 950 may be set differently, so that the controller 700 may control the colors of the light emitted from the display to be different for the individual modes 950 or may control the display 400 to be lit in a color set for each individual modes 950 independently of the temperature.

In an embodiment of the present disclosure, an operation relationship between the components including the controller 700 will be described as follows.

The operation unit 450 may be disposed on the main body 100 or the handle 500 and one of the plurality of operation modes 900 may be selected through the operation unit 450. The heater 120 may be disposed in the main body 100 and may adjust the temperature of the discharge gas discharged through the gas outlet portion 200. The fan 510 may be disposed in the main body 100 or the handle 500 and may adjust the speed of the discharge gas.

In one example, when the automatic mode 920 is selected among the plurality of operation modes 900 through the operation unit 450, the controller 700 may control the heater 120 and the fan 510 to sequentially execute the plurality of individual modes 950. In this connection, the at least one of the temperature and the speed of the discharge gas may vary based on the plurality of individual modes 950.

In this connection, the controller 700 may be electrically and signally connected to the operation unit 450, the heater 120, the fan 510, the lighting portion 180, and the display 400. In executing the automatic mode 920, the controller 700 may receive a signal from the operation unit 450 and may control the heater 120 and the fan 510 based on the temperature and the speed of the discharge gas preset for each individual mode 950.

The lighting portion 180 may be disposed on the main body 100 and may emit the light in the different colors in the plurality of individual modes 950. Further, the display 400 may display the currently executed individual mode 950 and the at least one of the temperature and the speed of the discharge gas.

Although a specific embodiment of the present disclosure has been illustrated and described above, those of ordinary skill in the art to which the present disclosure pertains will appreciate that various modifications are possible within the limits without departing from the present disclosure provided by the following claims.

What is claimed is:

1. A method for controlling a hair dryer including a main body including a gas outlet portion disposed thereon, a handle extending from the main body, an operation unit disposed on the main body or the handle, wherein one mode of a plurality of operation modes is able to be selected through the operation unit, a heater disposed inside the main body to adjust a temperature of discharge a gas discharged through the gas outlet portion, and a fan disposed inside the main body or the handle to adjust a speed of the discharged gas, the method comprising:

selecting an automatic mode for manipulating, by a user, the operation unit to select the automatic mode, the automatic mode being the one mode of the plurality of operation modes; and executing the automatic mode, the automatic mode being a mode for sequentially executing a plurality of individual modes, wherein at least one of the temperature or the speed of the discharged gas varies based on respective ones of the plurality of individual modes, wherein when executing the automatic mode, the heater and the fan respectively adjust the temperature and the speed of the discharged gas based on a setting of each of the plurality of individual modes.

2. The method of claim 1, wherein the plurality of individual modes include a scalp drying mode and a hair drying mode, and wherein the executing of the automatic mode includes:

a scalp drying operation for adjusting, by the heater, the temperature of the discharged gas to a first temperature and adjusting, by the fan, the speed of the discharged gas to a first speed based on the scalp drying mode; and a hair drying operation for adjusting, by the heater, the temperature of the discharged gas to a second temperature higher than the first temperature and adjusting, by the fan, the speed of the discharged gas to the first speed based on the hair drying mode after the scalp drying operation.

3. The method of claim 2, wherein the plurality of individual modes further include a styling mode, wherein the executing of the automatic mode further includes:

a styling operation for adjusting, by the heater, the temperature of the discharged gas to a third temperature higher than the second temperature and adjusting, by the fan, the speed of the discharged gas to a second speed lower than the first speed based on the styling mode after the hair drying operation.

4. The method of claim 3, wherein the plurality of individual modes further include a cooling mode, wherein the executing of the automatic mode further includes:

a cooling operation for adjusting, by the heater, the temperature of the discharged gas to a fourth temperature lower than the first temperature and adjusting, by the fan, the speed of the discharged gas to a third speed equal to or lower than the second speed based on the cooling mode after the styling operation.

5. The method of claim 4, wherein the executing of the automatic mode further includes:

a repetition operation for repeatedly executing the styling mode and the cooling mode after the cooling operation.

6. The method of claim 5, wherein the executing of the automatic mode executes a next individual mode when an execution time of a currently executed individual mode among the plurality of individual modes is equal to or greater than a reference time preset for the currently executed individual mode.

7. The method of claim 5, wherein the executing of the automatic mode terminates a currently executed individual mode and then executing a next individual mode when the user selects individual mode switch by manipulating the operation unit.

8. The method of claim 5, wherein the hair dryer further includes a lighting portion, wherein the lighting portion is disposed on the main body to emit light in a plurality of colors, and wherein when executing the automatic mode, the lighting portion emits light in different colors respectively in the plurality of individual modes.

9. The method of claim 8, wherein the hair dryer further includes a display, wherein the display is disposed on the main body to display a current operation state of the hair dryer, and wherein when executing the automatic mode, the display displays a currently executed individual mode and at least one of the temperature or the speed of the discharged gas.

10. The method of claim 9, wherein when executing the automatic mode, at least a portion of the display emits light in a color corresponding to the color emitted by the lighting portion.

11. A hair dryer comprising:

a main body including a gas outlet portion disposed thereon;

a handle extending from the main body;

an operation unit disposed on the main body or the handle, wherein one of a plurality of operation modes is able to be selected through the operation unit;

a heater disposed inside the main body to adjust a temperature of a gas discharged through the gas outlet portion;

a fan disposed inside the main body or the handle to adjust a speed of the discharged gas; and a controller configured to, when an automatic mode among the plurality of operation modes is selected through the operation unit, control the heater and the fan to sequentially execute a plurality of individual modes, wherein at least one of the temperature or the speed of the discharged gas varies based on the plurality of individual modes.

12. The hair dryer of claim 11, further comprising:

a lighting portion disposed on the main body to emit light in different colors respectively in the plurality of individual modes.

13. The hair dryer of claim 12, further comprising:

a display disposed on the main body to display a currently executed individual mode and at least one of the temperature or the speed of the discharged gas.

14. The hair dryer of claim 13, wherein the display includes an individual mode display portion having a shape of a ring extending along a rim of the display, wherein the individual mode display portion is divided into a plurality of lighting sections along an extension direction, wherein the plurality of lighting sections respectively and sequentially correspond to the plurality of individual modes along the extension direction, and wherein the individual mode display portion is configured such that n lighting sections from a first lighting section corresponding to an individual mode firstly executed in the automatic mode among the plurality of lighting sections to an n-th lighting section corresponding to a currently executed n-th individual mode are lit.

15. The hair dryer of claim 11, wherein the handle includes a gas inlet portion disposed at an end portion thereof in communication with the gas outlet portion, wherein the hair dryer further includes a gas flow path extending from an interior of the handle to an interior of the main body and communicating the gas inlet portion with the gas outlet portion, and wherein the fan is disposed on the gas flow path inside the handle.

* * * * *